(12) United States Patent
Imhof et al.

(10) Patent No.: US 7,664,574 B2
(45) Date of Patent: Feb. 16, 2010

(54) METHOD FOR REPRESENTING A BUILDING SYSTEM ENABLING FACILITY VIEWING FOR MAINTENANCE PURPOSES

(75) Inventors: Raphael Imhof, Arlington Heights, IL (US); Thomas Rule, Arlington Heights, IL (US); Osman Ahmed, Hawthorn Woods, IL (US); Pornsak Songkakul, Mequon, WI (US); George Phoenix, Buffalo Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 319 days.

(21) Appl. No.: 11/169,278

(22) Filed: Jun. 28, 2005

(65) Prior Publication Data
US 2006/0010388 A1 Jan. 12, 2006

Related U.S. Application Data

(60) Provisional application No. 60/583,519, filed on Jun. 28, 2004, provisional application No. 60/583,572, filed on Jun. 28, 2004, provisional application No. 60/583,585, filed on Jun. 28, 2004.

(51) Int. Cl.
*G05B 15/00* (2006.01)
(52) U.S. Cl. .......................... 700/276; 700/83
(58) Field of Classification Search ............. 700/83–87, 700/276, 279, 17, 65–67, 277, 278; 707/5, 707/102, 104
See application file for complete search history.

(56) References Cited

U.S. PATENT DOCUMENTS

| | | | |
|---|---|---|---|
| 5,611,059 A | 3/1997 | Benton et al. | 395/326 |
| 5,706,455 A | 1/1998 | Benton et al. | 395/348 |
| 5,761,674 A * | 6/1998 | Ito | 707/104.1 |
| 5,950,206 A * | 9/1999 | Krause | 707/104.1 |
| 6,104,963 A * | 8/2000 | Cebasek et al. | 700/86 |
| 6,141,595 A * | 10/2000 | Gloudeman et al. | 700/83 |
| 6,374,252 B1 * | 4/2002 | Althoff et al. | 707/102 |
| 6,487,457 B1 | 11/2002 | Hull et al. | 700/17 |

OTHER PUBLICATIONS

M.A. Rosenman, J.S. Gero, "Modelling Multiple Views of Design Objects in a Collaborative CAD Environment". Computer-Aided Design 28(3) (1996): 193-205.*

F. Wang, M. Rosenman. "A Component Agent Based Open CAD System For Collaborative Design". Automation in Construction 10 (2001): 383-397.*

* cited by examiner

*Primary Examiner*—Ryan A Jarrett
(74) *Attorney, Agent, or Firm*—Michael J. Wallace

(57) ABSTRACT

A method of displaying information regarding a building includes a step of storing a model of a building system in a memory, the model comprising a plurality of building objects. The building objects include building space objects and building automation device objects. Each object has a first field referencing at least one related object. The method also includes generating display information regarding a first object. The method further includes identifying a second object referenced in the first field of the first object and generating display information regarding the second object.

16 Claims, 12 Drawing Sheets

FIG. 5

| NAME | TYPE |
|---|---|
| [CHILD] ||
| [GRAPHIC] ||
| [PARENT] ||
| [COMMON NAME] ||

FIG. 5A

| 301 | ZONE |
|---|---|
| 302,304,306 324,360,362,364 ||
| 100_GRAPHIC ||
| BLDG_OBJECT ||
| "FIRST FLOOR" ||

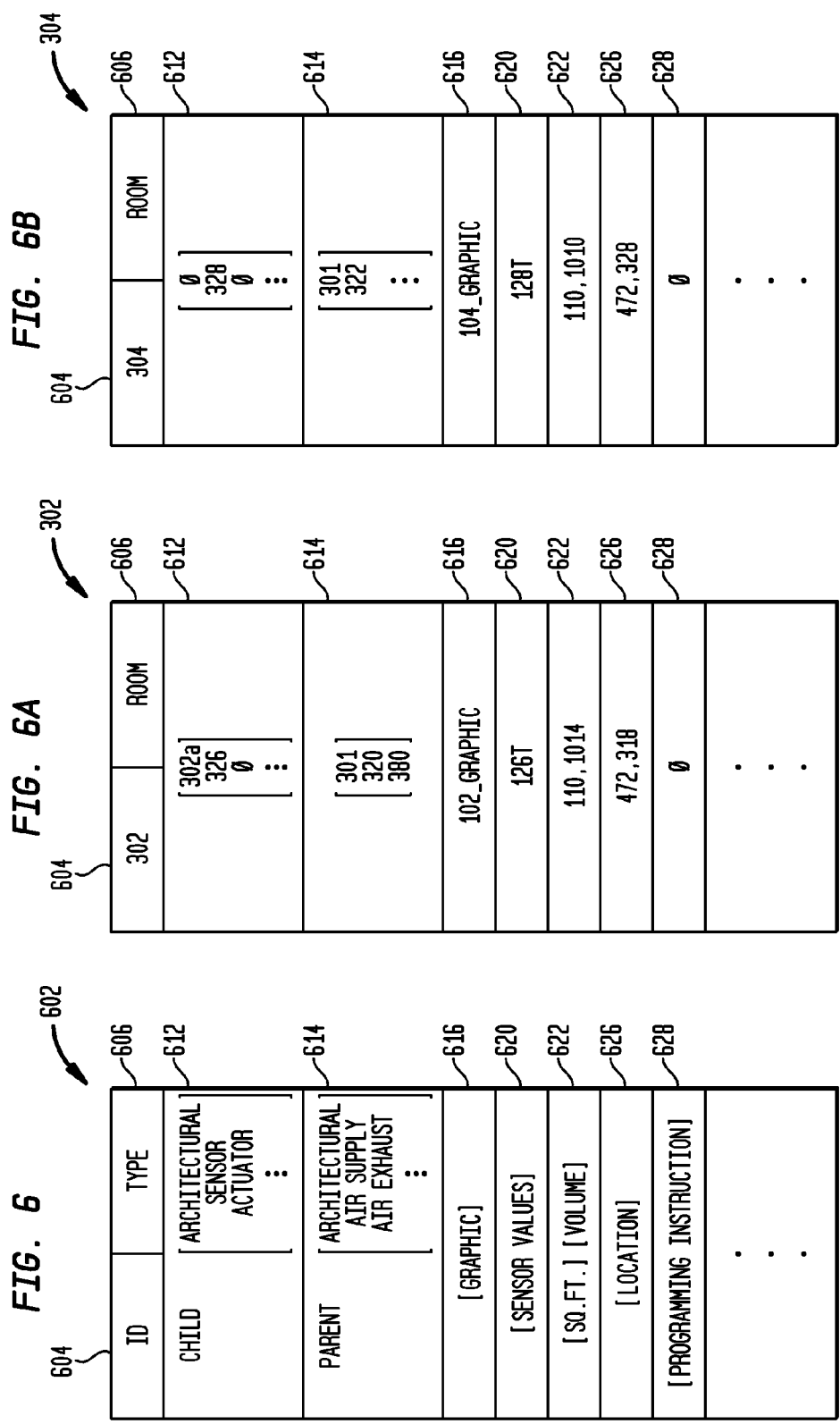

FIG. 7

| ID | TYPE | CHILD | PARENT | [GRAPHIC] | [SENSOR VALUES] | [X-SECTION AREA] | [LENGTH] | [LOCATION] | [PROGRAMMING INSTRUCTION] |
|---|---|---|---|---|---|---|---|---|---|
| | ARCHITECTURAL ACTUATOR SENSOR ... | [ARCHITECTURAL ...] | | | | | | | |

FIG. 7A

| 320 | INLET/VAV | [302 314,336 0] | [324 ...] | 0 | 0 | 44 | 12 | 480,321 | 0 | ... |

FIG. 7B

| 322 | INLET/VAV | [304 316,338 0] | [324] | 0 | 0 | 48 | 12 | 480,331 | 0 | ... |

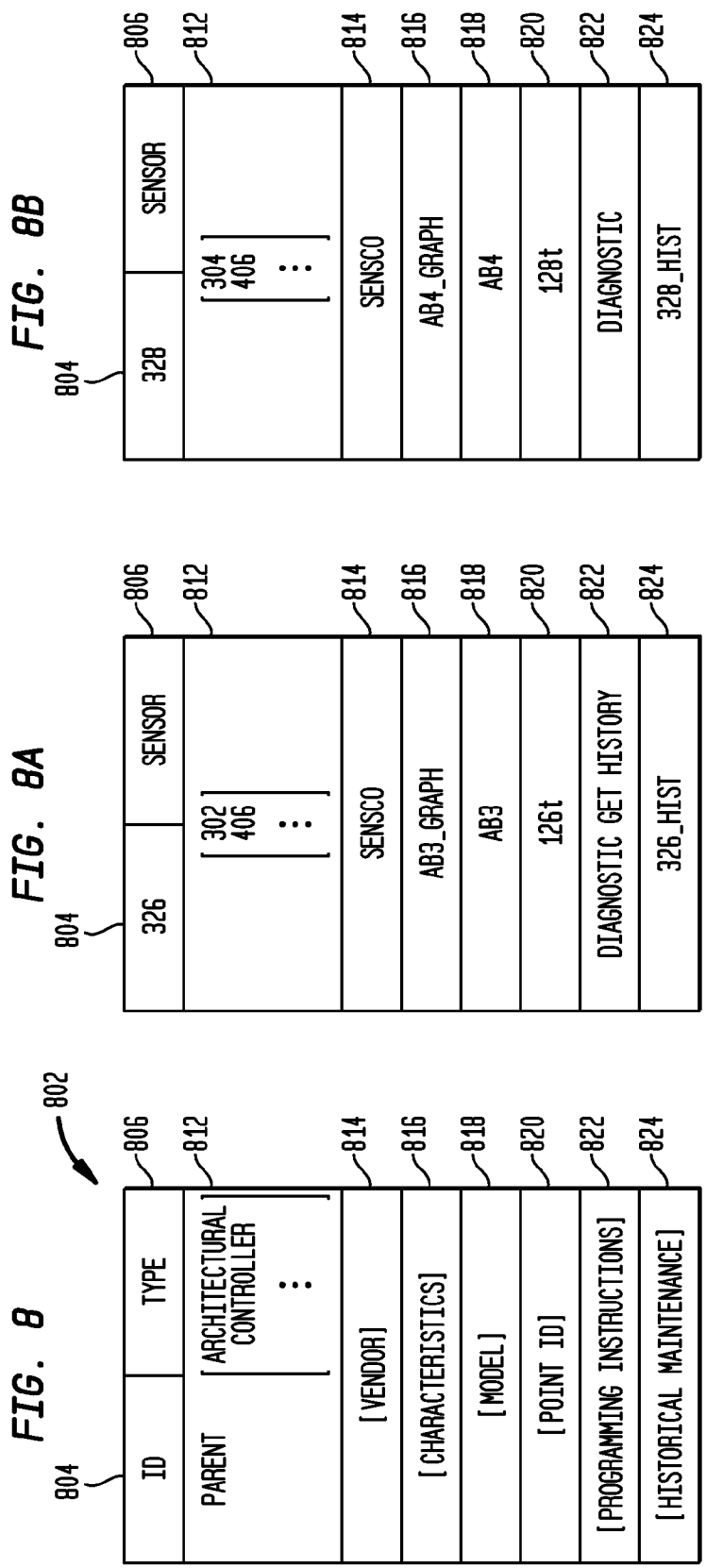

FIG. 9

| 904 | 906 | 912 | 914 | 916 | 918 | 920 | 922 | 924 | 926 |
|---|---|---|---|---|---|---|---|---|---|
| ID | TYPE | PARENT | [VENDOR] | [CHARACTERISTICS] | [MODEL] | [POINT ID] | [PROGRAMMING INSTRUCTIONS] | [HISTORICAL MAINTENANCE] | [CALIBRATION DATA] |
| | ARCHITECTURAL CONTROLLER | ... | | | | | | | ... |

| 904 | 906 | 912 | 914 | 916 | 918 | 920 | 922 | 924 | 926 |
|---|---|---|---|---|---|---|---|---|---|
| 312 | DAMPER | [324 408] ... | DAMPCO | 774B_GRAPH | 774B | 112C | DIAGNOSTIC CAL PROGRAM | 312_HIST | 312_CALDATA |

FIG. 9B

| 904 | 906 | 912 | 914 | 916 | 918 | 920 | 922 | 924 | 926 |
|---|---|---|---|---|---|---|---|---|---|
| 314 | DAMPER | [320 406] ... | DAMPCO | 172D_GRAPH | 172D | 114C | DIAGNOSTIC CAL PROGRAM | 314_HIST | 314_CALDATA |

METHOD FOR REPRESENTING A BUILDING SYSTEM ENABLING FACILITY VIEWING FOR MAINTENANCE PURPOSES

This application claims the benefit of U.S. Provisional Patent Application Ser. Nos. 60/583,519, 60/583,572, and 60/583,585, each filed Jun. 28, 2004, all of which are incorporated herein by reference.

CROSS REFERENCE TO RELATED APPLICATIONS

Cross reference is made to related patent application Ser. No. 11/169,282, filed Jun. 28, 2005, which is incorporated herein by reference.

FIELD OF THE INVENTION

The present invention relates generally to building automation systems, and more particularly, to methods and apparatus for representing and/or storing building automation system data.

BACKGROUND OF THE INVENTION

Building automation systems are comprehensive and distributed control and data collection systems for a variety of building automation functions. Such functions may include comfort systems (also known as heating, ventilation and air condition or HVAC systems), security systems, fire safety systems, as well as others. Building automation systems include various end points from which data is collected. Examples of such end points include temperature sensors, smoke sensors, and light sensors. Building automation systems further include elements that may be controlled, for example, heating coil valves, ventilation dampers, and sprinkler systems. Between the data collection end points and controlled elements are various control logic elements or processors that use the collected data to control the various elements to carry out the ends of providing a comfortable, safe and efficient building.

Building automation systems often employ one or more data networks to facilitate data communication between the various elements. These networks may include local area networks, wide area networks, and the like. Such networks allow for single point user access to many variables in the system, including collected end point data as well as command values for controlling elements. To this end, a supervisory computer having a graphical user interface is connected to one of the networks. The supervisory computer can then obtain selected data from elements on the system and provide commands to selected elements of the system. The graphical display allows for an intuitive representation of the elements of the system, thereby facilitating comprehension of system data. One commercially available building automation system that incorporates the above described elements is the Apogee system available from Siemens Building Technologies, Inc. of Buffalo Grove, Ill.

Increasingly, building automation systems have acquired more useful features to assist in the smooth operation of building systems. For example, in addition to controlling physical devices based on sensor readings to achieve a particular result, building automation systems increasingly are capable of providing trending data from sensors, alarm indications when thresholds are crossed, and other elements that directly or indirectly contribute to improved building system services.

However, most building systems have limited ability to associate sensor values with other building system or general building attributes. Advanced systems allow graphic representations of portions of the building to be generated, and for multiple sensor and/or actuator points to be associated with that graphic representation. By way of example, the Insight™ Workstation, also available from Siemens Building Technologies, Inc. is capable of complex graphical representations of rooms or large devices of the building system. While systems with such graphics provide at least some integrated visible representation of portions of the building automation system, the ability to use such data is limited.

A further issue related to prior building automation systems is that information required to maintain the system was often widely physically dispersed throughout a facility and was in a variety of formats. For example, blue prints and CAD drawings may be stored partly as paper copies in various locations, CAD files on one or more computer systems. Also, owner's manuals and service contact information may be stored in different computer systems or in various physical file rooms. Details about a device's maintenance history may be stored yet elsewhere. Such uncoordinated storage of information useful to building system maintenance personnel significantly affects the maintenance efficiency.

Accordingly, there is a need for a more comprehensive manner in representing various types of data related to a building system. Such manner of representation could facilitate the development of significant new automated services. Such manner of representation could preferably facilitate remote building control.

SUMMARY OF THE INVENTION

The present invention provides an improved building system model and method for generating the same. The model is a data mode that links information regarding building topology and building automation devices, among other things. The model facilitates a large set of extended services.

A first embodiment of the invention is a model of a building system that is stored in a memory. The model comprises a plurality of building space objects and at least one building automation device object. At least one building space object includes a reference to at least one of the group consisting of a parent building space object and a child building space object, a reference to at least one graphic file containing a graphic image representation of the building space, and a reference to information regarding one or more building automation devices associated with the building space object. Each building automation device object includes a reference to a corresponding building space object, and a reference to at least one operating value of the building automation device. Optionally building automation device objects may further include a reference to a link to a file containing information regarding the at least one building automation device object.

A second embodiment is a method of providing images relating to a facility. The method includes accessing a model of a building, the model including building objects representative of building spaces and building system devices. The method also includes constructing a set of information to be displayed based on a request having at least one parameter, the set of information including associated building objects, wherein the associated building objects have at least one data field having information corresponding to the at least one parameter.

By way of example a set of objects in a certain location, or being connected to a particular room or system, may be identified using the at least one parameter in the request. The building objects have data fields from which it may be determined if the objects correspond to the at least one parameter.

The above described features and advantages, as well as others, will become more readily apparent to those of ordinary skill in the art by reference to the following detailed description and accompanying drawings.

BRIEF DESCRIPTION OF THE DRAWINGS

FIG. 5 shows a block diagram of an exemplary building zone template for use in generating building zone objects in a model according to an embodiment of the invention;

FIG. 5a shows a block diagram of a building zone object of the model of FIG. 4 generated from the building zone template of FIG. 5;

FIG. 6 shows a block diagram of an exemplary room space template for use in generating room space objects in a model according to an embodiment of the invention;

FIGS. 6a and 6b shows a block diagram of room space objects of the model of FIG. 4 generated from the room space template of FIG. 6;

FIG. 7 shows a block diagram of an exemplary inlet shaft segment template for use in generating inlet shaft segment objects in a model according to an embodiment of the invention;

FIGS. 7a and 7b show block diagrams of inlet shaft segment objects of the model of FIG. 4 generated from the inlet shaft segment template of FIG. 7;

FIG. 8 shows a block diagram of an exemplary temperature sensor template for use in generating temperature sensor objects in a model according to an embodiment of the invention;

FIGS. 8a and 8b show block diagrams of temperature sensor objects of the model of FIG. 4 generated from the temperature sensor template of FIG. 8;

FIG. 9 shows a block diagram of an exemplary damper template for use in generating damper objects in a model according to an embodiment of the invention;

FIGS. 9a and 9b show block diagrams of damper objects of the model of FIG. 4 generated from the damper template of FIG. 9.

DETAILED DESCRIPTION

Figure 1:
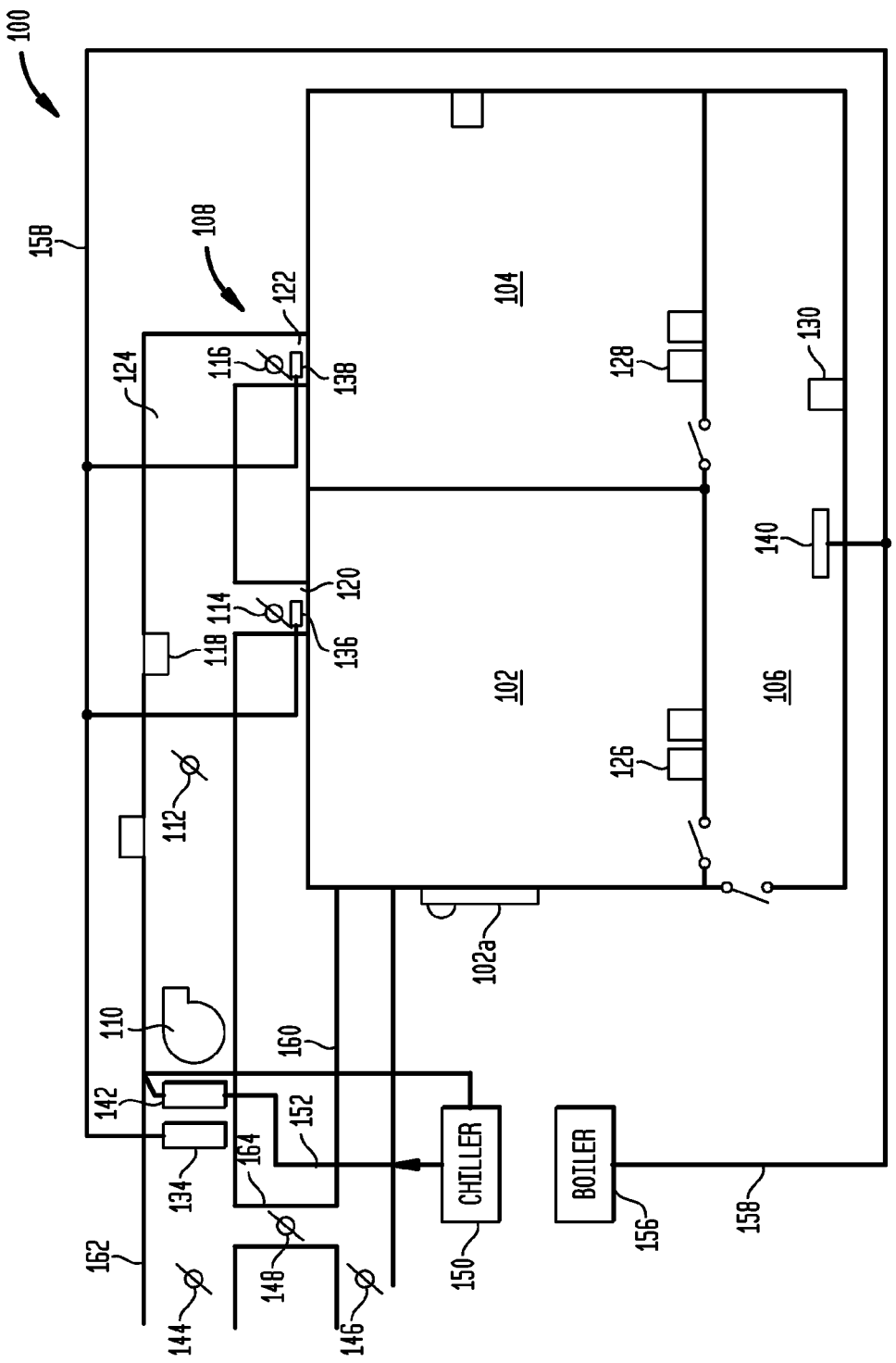
FIG. 1 shows a mechanical top view floor plan diagram of a building space wherein various HVAC elements are schematically represented.

FIG. 1 shows a top view of a building zone 100 that includes a number of building automation devices that form a portion of the heating, ventilation and air conditioning ("HVAC") for the building system. The building zone 100 includes a first room space 102, a first window 102a, a second room space 104, a hall space 106 and mechanical space 108. The mechanical space 108 is illustrated as being adjacent to the room spaces 102 and 104 for clarity of exposition, but in actuality would also typically extend over the top of the first room space 102, the second room space 104, and the hall space 106.

The portion of the HVAC system shown in FIG. 1 includes an air handling unit ("AHU") 110, a shaft damper 112, a first room damper 114, a second room damper 116, a flow sensor 118, a first room inlet 120, a second room inlet 122, a shaft branch 124, a first temperature sensor 126, a second temperature sensor 128, and a space temperature adjuster 130. The portion of the HVAC system further includes hot water exchangers or coils 134, 136, 138 and 140, a chilled water exchanger or coil 142, a fresh air damper 144, an exhaust damper 146 and a mixing damper 148. The HVAC system also includes a chiller 150 and associated distribution pipes 152, and a boiler 154 and associated hot water distribution pipes 156.

Also shown in FIG. 1 is a security sensor 132 that may be a portion of a security system in the building zone 100. The HVAC system has further control elements and networks that are not illustrated in FIG. 1, but are represented schematically in FIG. 2, which is discussed further below. FIG. 1 primarily shows only the mechanical devices in the HVAC system.

In general, the HVAC system is designed to, among other things, regulate temperature in the first room space 102 and the second room space 104. To this end, the HVAC system advances cool (or warm air) into the first and second room spaces 102, 104 as needed to maintain a desired temperature. The "desired temperature" may vary from room space to room space, or may be uniform through the building zone 100. The desired temperature is referred to herein as the set point temperature, and may be dictated by a local thermostat setting or from a central control device, as will be discussed in further detail below.

Referring to the structure of the HVAC system of FIG. 1, the AHU 110 is a mechanical device well known in the art that is configured to blow air through the shaft branch 124, as well as other similar shaft branches, not shown. The shaft branch 124 extends adjacent to the room spaces 102 and 104. The first room inlet 120 extends from a portion of the shaft branch 124 toward the first room space 102 and is in fluid communication with the first room space 102. The first room inlet 120 may suitably be a variable air volume or VAV box as is well known in the art. The room inlet 120 contains the first room damper 114 and the hot water coil or heating coil 136. The first room damper 114 operates to controllably meter the flow of air from the shaft branch 124 to the first room space 102. The heating coil 136 allows the air entering the first room space to be heated in the event that temperature of the room space 102 needs to be raised.

Similarly, the second room inlet 122 extends from another portion of the shaft branch 124 toward the second room space 104 and is in fluid communication with the second room space 104. The second room inlet 122 may also suitably be a VAV box known in the art, and in any event contains the second room damper 116 and the heating coild 138. The second room damper 116 and operates to controllably meter the flow of air from the shaft branch 124 to the second room space 104.

The shaft damper 112 is arranged in the shaft branch 124 to meter the overall air flow through the shaft branch 124.

To accomplish the regulation of air flow, each of the dampers 112, 114 and 116 is a mechanical device that is configured to controllably restrict the flow of air therethrough. Ventilation damper devices are well known in the art and may take many forms. Each damper 112, 114 and 116 has an actuator associated therewith, not shown in FIG. 1, which controls the opening and closing of the damper. As will be discussed below in connection with FIG. 2, the damper actuator is controlled by a control device to either further open or further close the damper in order to increase or decrease, respectively, the flow of air therethrough.

As shown in FIG. 1, the system also includes an air return or exhaust shaft 160, which is designed to receive exhaust air from the room 102. The shaft 160 may suitably also be in communication with the second room space 104, although not illustrated in FIG. 1 for purposes of clarity. The exhaust shaft 160 extends to the outside of the building or the like. A recirculation shaft 164 branches off the exhaust shaft 160 to draw off at least some exhaust air for recirculation. The recirculation shaft 164 extends to a fresh air inlet 162 for the AHU 110. An exhaust damper 146 disposed within the exhaust shaft 160 regulates the amount of exhaust air that is evacuated from the building, while the recirculation damper 148 regulates the amount of exhaust air that is mixed with fresh air and recirculated through the building via the AHU 110. The fresh air inlet 166 includes a damper 144 or similar device that regulates the amount of fresh air that is supplied to the AHU 110.

The dampers 144, 146 and 148 may suitably have a construction and operation similar to that described above in connection with the dampers 112, 114 and 116. The dampers 144, 146 and 148 preferably also have associated actuators which allow for automated control of the air flow through the dampers.

The air circulated through the shaft 124 and thus into the room spaces 102 and 104 my either be heated air or cooled air, depending on the season. To this end, the chiller plant 150 provides chilled water that is circulated to, among other things, the chilled water coil 142. The chilled water coil 142 is a device that absorbs heat to effect a transfer of cooling. In general, the chilled water coil 142 includes a series of conduits that allow for heat exchange between the surrounding air and coolant inside the conduits. The chilled water coil 142 also includes a valve that controls the flow of chilled water into the heat exchange conduits. Analogous to the ventilation dampers 112, 114 and 116, the chilled water coil 142 includes an associated actuator, not shown in FIG. 1, that allows for remote, automated control of the opening and closing of the valve.

The chilled water coil 142 is disposed adjacent the AHU 110 such that when the conduits are full of chilled water (or other coolant), the AHU 110 causes air to flow though the chilled water coil 142 such that the air is chilled. When the chilled water chilled 142 does not include chilled water (because the valve is closed), the air still flows through the exchanger 142, but is not chilled.

In a similar manner, the boiler plant 154 provides hot water or steam that is circulated to, among other things, several heat exchangers or heating coils 134, 136, 138 and 140. The heating coils 134, 136, 138 and 140 may suitably have a structure similar to the chilled water coil 142. Each heating coil 134, 136, 138 and 140 includes a valve and associated actuator to control the opening and closing of the valve. When the valve is closed, no additional hot water flows through the coil, and the surrounding air is not heated. When the valve is open, fresh hot water and/or stream is supplied to the coil, and the surrounding air is heated.

The heating coil 134 is positioned in the vicinity of the AHU 110. When the valve of the heating coil 134 is opened, the AHU 110 blows heated air through the shaft 124. As discussed above, the heating coils 136 and 138 are disposed at the room inlets 120 and 122, respectively. As air flows into the room spaces via the inlets 120 and 122 from the shaft 124, the heating coils 136 and 138 may controllably heat the air flow to allow for particularized air temperature control in the individual room spaces 102 and 104. The heating coil 140 in the hall space 106 may suitably include a baseboard heating element.

In order to determine whether more or less cold (or warm air) is needed to achieve or maintain a set point temperature, the controlling units of the HVAC system (see FIG. 2 discussed below) obtain measured or sensed temperatures from the temperature sensors 126 and 128. If the measured temperature at either sensor is higher than the set point temperature, then the HVAC system controlling units may cause additional cold air to be advanced into the corresponding room space 102 and/or 104 by further opening the dampers 112, 114 and/or 116. Likewise, if the measured temperature is lower than the set point temperature, then the HVAC system controlling units may cause reduced cold air flow into the room spaces 112, 114 and 116 by further closing the dampers 112, 114 and/or 116. In addition to merely controlling air flow, one or more of the various heating and chilled water coils 134, 136, 138, 140 and 142 may be controlled to increase or decrease the temperature as needed.

The chiller plant 150 may suitably be any cooling unit known in the art for use in performing chilling functions in a building or facility. The chiller plant 150 may suitably have various parameters that are also controllable via HVAC system controlling units, as is known in the art. The boiler plant 156 is similarly any suitable boiler known in the art or otherwise.

While the various heating and cooling needs may be controlled by increasing or decreasing the flow of heated or chilled air in the room spaces 102 and 104, sometimes merely varying the flow of the air in the shaft 124 is inadequate to achieve the desired temperature, particularly, when one or more room spaces have vastly different cooling or heating requirements. For example, consider a situation in which the first room space 102 has a south-facing window and the second room space 104 does not. The resulting extra sunlight in the first room 102 space may create the need for much more cooling air flow than that which is needed for the second room space 104. The various heating and cooling coils may be manipulated to ensure sufficient cooling in the first room space 102 without overcooling in the second room space 104. For example, the chilled water coil 142 would coordinate with the AHU 110 to provide air that is sufficiently cooled to satisfy the needs of the first room space 102, and the heating coil 138 would warm the highly cooled air from the shaft 124 to a more moderate level for the second room space 104.

Figure 2:
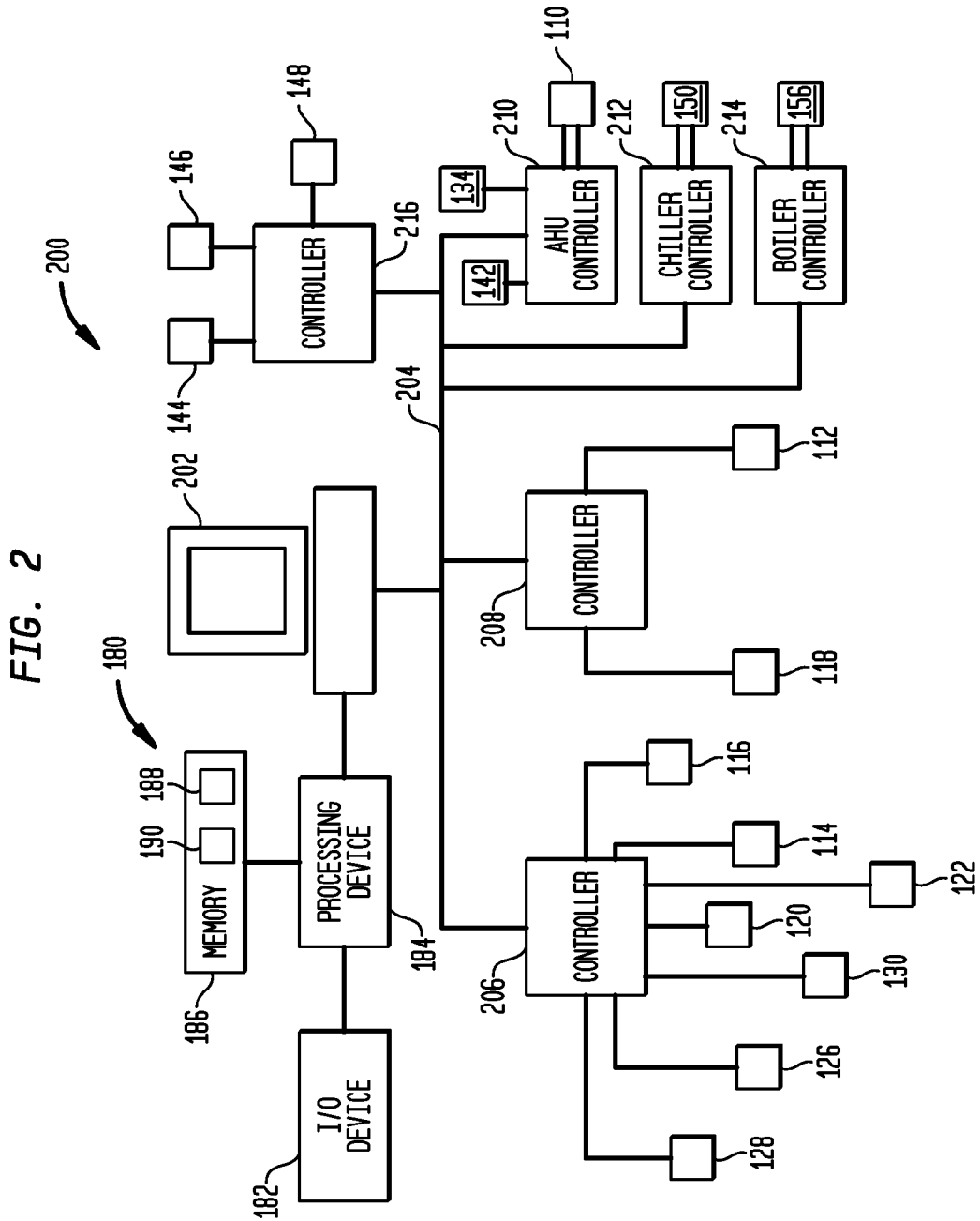
FIG. 2 shows a schematic diagram of the building automation system that employs the HVAC elements of the building space of FIG. 1.
Figure 3:
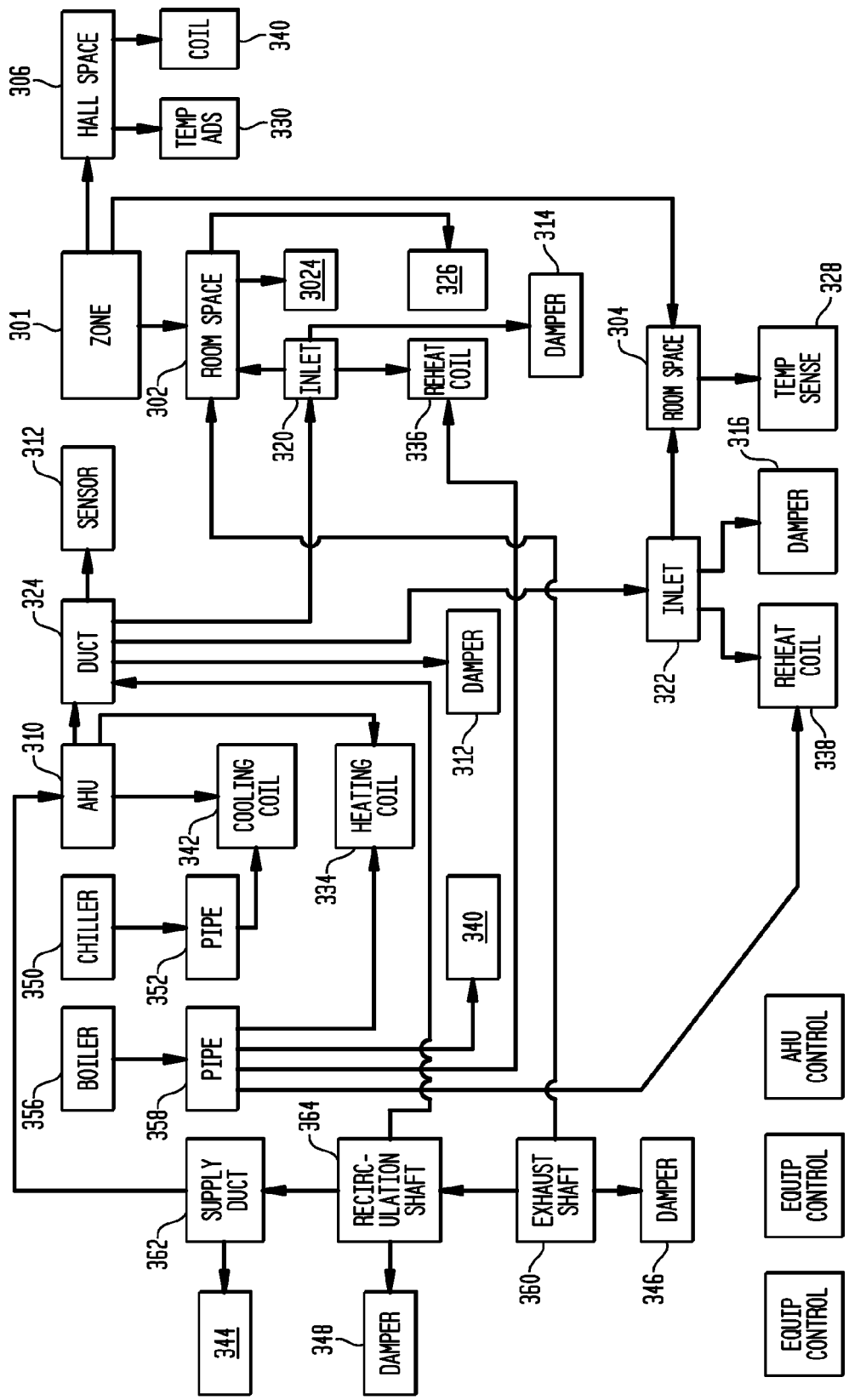
FIG. 3 shows a block diagram representation of an exemplary model of the building system illustrated in FIGS. 1 and 2, the model incorporating aspects of the invention.

In accordance with aspects of the present invention, the HVAC elements of FIG. 1, as well as the corresponding control circuitry not shown in FIG. 1 (see FIG. 2), are represented by at least one control device in a building model. The building model provides information regarding capabilities and operations of the individual elements, as well as information as to how the elements interrelate within the building system. Further details regarding an exemplary building model according to the invention are provided below in connection with FIG. 3 FIG. 2 shows a schematic representation of the HVAC system 200 that includes electrical control and communication devices as well as the HVAC system mechanical elements shown in FIG. 1. The HVAC system 200 includes a control station 202, a building network 204, first, second and third equipment controllers 206, 208 and 216, an air-handling unit controller 210, a chiller controller 212 and a boiler controller 214. The control station 202 is a device that provides status monitoring and control over various aspects of the HVAC system 200. By way of example, the control station 202 may suitably be an INSIGHT™ model workstation available from Siemens Building Technologies, Inc., discussed further above. The building network 204 is a communication network that allows communication between the control station 202 and the controllers 206, 208, 210, 212, 214 and 216, as well as other devices not depicted in FIG. 2. Such building networks are known in the art. Suitable building communication networks designed for use with the INSIGHT™ model workstation include building level networks available with the APOGEE™ building automation system also available from Siemens Building Technologies, Inc.

The first controller 206 is a device that is operable to receive one or more sensor inputs and generate controlled process outputs based on the sensor inputs and one or more set points. Sensor inputs, for example, may be representative of measured temperature values. Controlled process outputs, for example, may be actuator signals that cause a ventilation damper to further open or further close. Various suitable commercially available equipment controllers are known in the art, including modular equipment controllers available from Siemens Building Technologies, Inc.

To generate the process output based on set points and sensor inputs, the first controller 206 is operable to perform a control function, such as a proportional control function, a proportional-integral control function, or a proportional-integral-derivative ("PID") control function (or possibly others). Such control functions use values representative of a measured phenomenon to determine how to manipulate a physical process to attempt to bring the measured phenomenon toward a set point.

In the embodiment shown in FIG. 2, the equipment controller 206 is operable to generate an output that causes either or both of the dampers 114 and 116 to open or close in response to temperature sensor values received from the temperature sensors 126 and 128. To this end, the dampers 114 and 116, as discussed above, include associated actuators that are capable of moving the damper blades or fins responsive to control signals. The equipment controller 206 is further operable to cause the valve to allow hot water to flow through coils 136 and/or 138. As with the dampers, the coils 136 and 138 include associated actuators that are capable of opening and closing flow valves responsive to control signals. Details regarding actuators and their use with devices such as dampers and water valves would be known to those of ordinary skill in the art.

The equipment controller 206 is further operable to receive the set point temperature value from the space temperature adjuster 130. In some embodiments, the equipment controller 206 may receive temperature set points from other devices, such as the control station 202, via the building network 204. The equipment controller 206 may utilize set points from the control station 202 and the space temperature adjuster 130 at different times of day, or for different purposes.

Regardless of whether the set point is received from the control station, the equipment controller 206 is also operable to communicate to other system control elements such as the control station 202 and the other equipment controllers 208, 210, 212, 214 and 216 over the building network 204. Information is communicated between controllers in order for the temperature, fresh air flow and other parameters may be controlled through efficient combinations of operations of the various ventilation dampers, heating and cooling coils and the AHU.

The other equipment controller 208 is operable to generate an output that causes the shaft damper 112 to open or close in response to one or more sensor signals and set points. For example, the determination to further open or close the shaft damper 112 may depend at least in part on the measured air flow in the shaft branch 124. To this end, the equipment controller 208 is also operable to receive shaft air flow values from the shaft flow sensor 118. The controller 208 may then suitably be configured to generate the output based on the received shaft air flow values and a set point set by the control station 202. The control station 202 may alter the set point based in part on the temperature values measured by the temperature sensors 126 and 128, operating characteristics of the AHU 110, or combinations of many factors.

The AHU controller 210 is operable to control the AHU device 110, as well as the associated chilled and heated water coils 142 and 134 respectively. The AHU controller 210 is operable to control such devices based on a variety of parameters, including for example, information from the other controllers 206 and 208. For example, if the temperature values from the sensors 126 and 128 indicate that the temperature in the spaces 102 and 104 needs to be reduced, and the controller 206 has opened the either of the dampers 114 or 116 to the fullest or near fullest extent, such information is communicated to the AHU controller 210. The AHU controller 210 then causes the valve of the chilled water coil 142 to be opened, to allow the AHU 110 to advance cooler air to the room spaces 102 and 104 via the shaft 124.

The chiller controller 212 is configured to control the operation of the chiller plant 150, and the boiler controller 214 is configured to control the operation of the boiler 156. Such control devices are known in the art. The equipment controller 216 controls the operation of the dampers 144, 146 and 148 to manage the recirculation of air within the facility. As is known in the art, recirculation of air helps reduce energy usage costs because the recirculated air is typically more near the desired temperature than fresh outside air. However, buildings require at least some fresh air to maintain a healthy environment. The dampers 144, 146 and 148 are controlled to provide an appropriate balance of fresh and recirculated air using control methods known in the art. To this end, the room spaces 102, 104, the ventilation shaft branch 124, and/or other locations may include air quality sensors, not shown, that indicate whether more fresh air is required.

It will be appreciated that the control algorithms and schemes of the HVAC system 200 are given by way of illustrative example, and that those of ordinary skill in the art may readily device suitable control schemes for HVAC systems of any particular building space. The exact nature of how to develop specific applications of control schemes is outside the scope of the disclosure and would be readily apparent to those of ordinary skill in the art.

In accordance with the present invention, a system 180 for developing and storing a model of the building system 100 is operably connected to communicate to the control station 202. Such a connection may be through an intranet, the Internet, or other suitable communication scheme. In alternative embodiments, the system 180 and the control station 202 are present on the same host computer system.

In any event, the system 180 includes I/O devices 182, a processing circuit 184 and a memory 186. The I/O devices 182 may include a user interface, graphical user interface, keyboards, pointing devices, remote and/or local communication links, displays, and other devices that allow externally generated information to be provided to the processing circuit 184, and that allow internal information of the system 180 to be communicated externally.

The processing circuit 184 may suitably be a general purpose computer processing circuit such as a microprocessor and its associated circuitry. The processing circuit 184 is operable to carry out the operations attributed to it herein.

Within the memory 186 is a model 188 of the building system 100. The model 188 is a collection of interrelated data objects representative of, or that correspond to, elements of the building system 100. Elements of the building system may include any of the illustrated in FIGS. 1 and 2, as well as other elements typically associated with building systems. Building system elements are not limited to HVAC elements, but may include security devices such as the security sensor 132 or the like, fire safety system devices, lighting equipment, or other building equipment.

An example of the model 188 of the HVAC system 200 of FIGS. 1 and 2 is illustrated in FIG. 3 in further detail. With reference to FIG. 3, the model 188 includes a building zone object 301, a first room space object 302, a first window object 302*a*, a second room space object 304, a hall space object 306, an AHU object 310, a shaft damper object 312, a first room damper object 314, a second room damper object 316, a flow sensor object 318, a first room inlet object 320, a second room inlet object 322, a shaft branch object 324, a first temperature sensor object 326, a second temperature sensor object 328, a space temperature adjuster object 330. The model 188 may also include a mechanical space object, but it is not shown in FIG. 3 for the purposes of clarity of exposition.

The model 188 also includes a chiller plant object 350, a chilled water object 352, a boiler object 356, a hot water/steam pipe object 358, a reheat coil object 336, a reheat coil object 338, a supply shaft object 362, a recirculation shaft object 364, an exhaust shaft object 360, an exhaust damper object 346, a supply damper object 344, and an exhaust damper object 346.

The model 188 also includes controller elements, such as those corresponding to the controllers 206, 208, 210, 212, 214 and 216. These are discussed further below. In general, the interrelationship of the objects corresponding to controllers 206, 208, 210, 212, 214 and 216 generally follows the interrelationships of the schematic diagram of the system 200 in FIG. 2. For example, the object corresponding to the controller 208 interrelates to the objects corresponding to the damper 112 and the flow sensor 118.

The objects generally relate to either primarily physical building structures or building automation system devices. Building structure (or space) objects correspond to static physical structures or locations within a building space, such as room spaces, hall spaces, mechanical spaces, and shaft elements. Building automation system device objects correspond to active building automation system elements such as sensors, dampers, controllers and the like. It is noted that some elements, such as ventilation shaft elements, could reasonably qualify as both types of elements in other embodiments. However, in the exemplary embodiment described herein, the shaft elements are considered to be building structure elements as they tend to define a subspace within the building space.

Each object in the model 188 corresponds to an element of the building system of FIGS. 1 and 2. Table 1, below lists the objects, and defines the element of the building system to which they correspond.

TABLE 1

| OBJECT No. | CORRESPONDING ELEMENT |
|---|---|
| 301 | Zone 100 |
| 302 | Room Space 102 |
| 302a | Window 102a |
| 304 | Room Space 104 |
| 306 | Hall Space 106 |
| 308 | Mechanical Space 108 |
| 310 | AHU 110 |
| 312 | Shaft Damper 112 |
| 314 | First Room Damper 114 |
| 316 | Second Room Damper 116 |
| 318 | Flow Sensor 118 |
| 320 | Room Inlet 120 |
| 322 | Room Inlet 122 |
| 324 | Shaft Branch 124 |
| 326 | Temperature Sensor 126 |
| 328 | Temperature Sensor 128 |
| 330 | Temperature Adjuster 130 |
| 334 | Heating Coil 134 |
| 336 | Heating Coil 136 |
| 338 | Heating Coil 138 |
| 340 | Heating Coil 140 |
| 342 | Chilled Water Coil 142 |
| 344 | Supply Damper 144 |
| 346 | Exhaust Damper 146 |
| 348 | Recirculation Damper 148 |
| 350 | Chiller Plant 150 |
| 352 | Chilled Water Distribution Pipe 152 |
| 356 | Boiler 156 |
| 358 | Hot Water/Steam Distribution Pipe 158 |
| 360 | Exhaust Shaft 160 |
| 362 | Supply Shaft 162 |
| 364 | Recirculation Shaft 164 |
| 406 (not in FIG. 3) | Equipment controller 206 |
| 408 (not in FIG. 3) | Equipment controller 208 |
| 410 (not in FIG. 3) | AHU controller 210 |
| 412 (not in FIG. 3) | Chiller controller 212 |
| 414 (not in FIG. 3) | Boiler controller 214 |
| 416 (not in FIG. 3) | Equipment controller 216 |

Each object is a data object having a number of fields. The number and type of fields are defined in part by the type of object. For example, a room space object has a different set of fields than a temperature sensor object. A field usually contains information relating to a property of the object, such as a description, identification of other related objects, and the like.

The model 188 is built by creating objects from a library of templates 190 (see FIG. 2), which may also be stored in the memory 186. The library of templates 190 contain templates for several types of objects, and ideally for all types of object. Various examples of templates are discussed herein. In particular, FIG. 5 shows a building zone template 502, FIG. 6 shows a room space template 602, FIG. 7 shows an inlet shaft segment template 702, FIG. 8 shows a temperature sensor template 802, and FIG. 9 shows a damper space template 902. Other templates for other elements may be developed by those of ordinary skill in the art applying the principles illustrated herein.

It is also noted that the diagram of the model in FIG. 3 shows parent/child relationships between the objects of the model. In FIG. 3, an arrow between two objects symbolizes a parent/child relationship. The arrowhead points to the child of the relationship. Thus, for example, the distribution pipe object 358 as illustrated in FIG. 3 has four child objects, coil objects 334, 336, 338 and 340, and one parent object, the boiler object 356. These parent/child relationships provide the model 188 with the potential for a large range of uses. The parent/child relationships allow for all aspects that relate to or affect a room space, device, or duct, to be accessed in a logical manner.

For example, according to the model 188, the room space object 302 has immediate parent objects of the inlet object 320 and the exhaust shaft object 360. The model 188 allows for further analysis of the room space object 302 by providing information that identifies the parent and child objects of the inlet object 320 and the exhaust shaft object 360. One may use this information to determine that the reheat coil 336, the damper 314 and the duct 324 relate (as related objects of the inlet object 320) to the room space object 302. Such associations may be used to determine the source of malfunctions, study system efficiency, adjust operating parameters and the like.

In the exemplary embodiment described herein, a parent object is basically defined as an object that either contains, controls or otherwise affects, a child node. For example, the zone object 301 is a parent to the room space objects 302 and 304 because the building zone 101 (corresponding to the object 301) contains the room spaces 102 and 104 (corresponding to the objects 302 and 304). The inlet object 320 is a parent to the room space object 302 because the inlet 120 is the source of cooling and heating air to the room 120, and therefore "affects" room 120. In the embodiment described herein, the room inlet object 320 is also the parent to the heating coil object 336 and the damper object 314 because the corresponding room inlet 120 contains the heating coil 136 and the damper 114. Equipment controller objects, such as the controller object 406, are parent objects to all of the devices that they control, or which are "anchored" to it. For example, the equipment controller 206 controls the dampers 114 and 116, and thus the corresponding objects 314 and 316 are child objects of the corresponding equipment control object 406. Also, because the temperature sensor 130 is connected to the equipment controller 206, the corresponding equipment controller object 406 is the parent object to the temperature sensor object 330.

It will be appreciated that an object may have multiple parent objects and/or multiple children objects. FIG. 3 generally illustrates how the objects corresponding to the building system elements of FIG. 1 would be assigned parent/child relationships. This schema may plainly be applied to any type of building system using the same concepts.

It will be appreciated that other methods of defining parent and children nodes may be implemented. However, it is preferable that the definition be consistent throughout the model 188 so that use of the model 188 is predictable.

Figure 4:
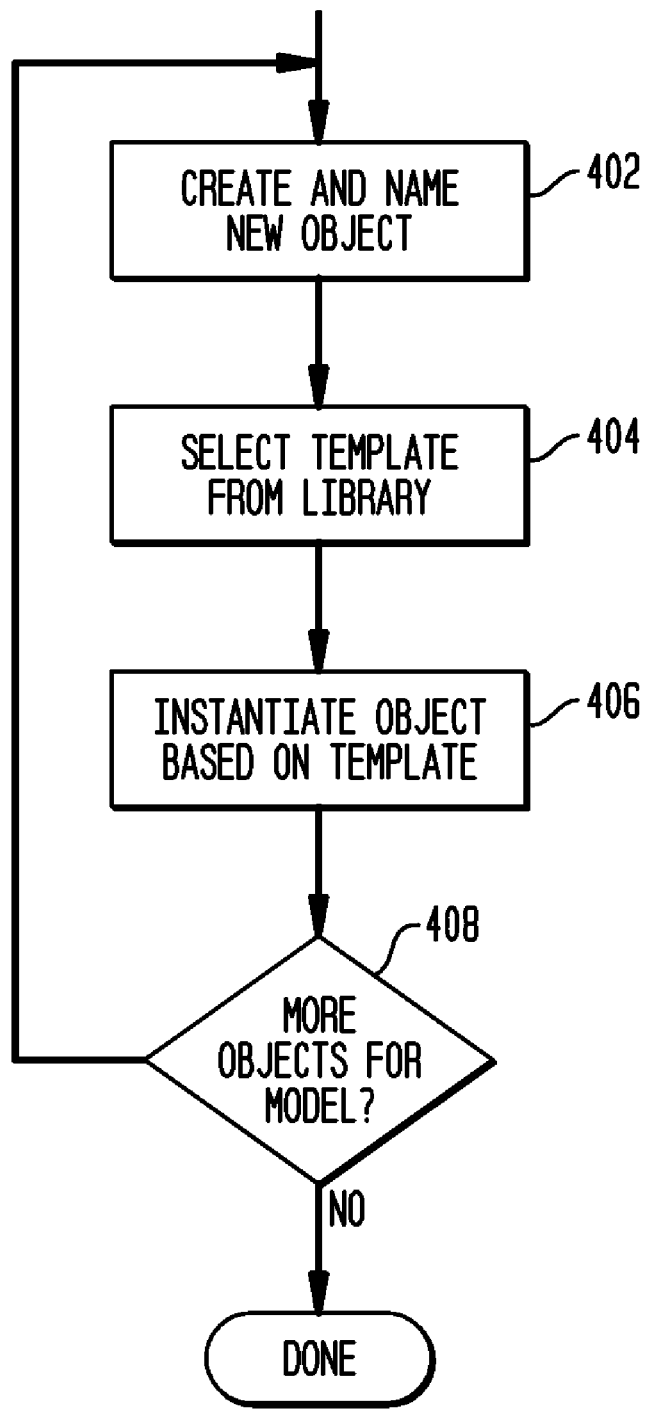
FIG. 4 shows a flow diagram of an exemplary set of operations performed to generate a model in accordance with aspects of the invention.

FIG. 4 shows an exemplary method that may be used to generate a model such as the model 188. In step 402, the user generates a new object for a selected building system element, and gives the object an identification value or name. To this end, the user may enter information through the I/O devices 182 of the system 180 of FIG. 2.

Thereafter, in step 404, the user selects an object template corresponding to the selected building system element. To this end, the processing device 184 may cause the I/O devices 182 to display one or more menus of templates available from the template library 190 stored in the memory 186. The user may then use the I/O devices 182 to enter a selection, which is received by the processing device 184.

Then, in step 406, the user instantiates the selected object template by providing appropriate values to the fields available in the object template. To this end, the processing device 184 may suitably prompt the user for each value to be entered as defined by the selected template. The types of values entered will vary based on the type of template. Building structure templates vary, but share some similarities, as do building automation device templates.

Once the object is instantiated, the processing circuit 184 stores the object in the memory 156 in a manner that associates the object with the model 188. In step 408, the user may select whether additional objects are to be created. If not, then the process is completed. If so, however, then the user creates and names a new object in step 402 and proceeds as described above.

Examples of templates, and how such templates would be populated or instantiated using the data of the building system of FIGS. 1 and 2, are provided below in connection with FIGS. 5-9. It will be appreciated that the objects may suitably take the form of an XML object or file.

FIG. 5, for example, shows a building zone template 502. When the user creates an object for the building zone 100 of the building system of FIGS. 1 and 2, the user employs the building zone template 502. The building zone template 502 in the exemplary embodiment described herein has a unique identifier value 504, a type identifier 506, and four fields: a child field 512, a graphic field 514, a parent field 516, and a common name field 518. The data structure contained in, or pointed to by the value in, the child field 512 is an array and may have multiple values. Each element of the array is an identifier value for child entities of the building, such as room spaces, hall spaces and the like. The identifier value may suitably be the identifier of the object corresponding to those child entities. The child field 512 thus allows the building object to be associated with other objects, namely room space, hall space and other space objects, in the model 188. In some embodiments, the child field 512 of the building zone object may include the controllers located in, or controlling devices located in the building zone.

The graphic field 514 contains a pointer to a graphics file. The graphics file contains a graphical representation of the zone, such as a floor plan similar to that illustrated in FIG. 1. The data structure for the parent field 516 may suitably be an array. The values in the parent field 516 may suitably include the identifier for the building object of the building in which the building zone is located. For example, the building zone 100 of FIG. 1 may be a floor or wing of a building, and thus its parent object is the object for the entire building. The common name field 518 is a string. The common name field 518 could contain a commonly known name for the building zone, such as the "first floor", or "eastern wing". Thus, the building zone template 502 provides two ways to identify the building: the system object identifier and the common name.

FIG. 5a shows the building object 301 formed by instantiating the building template 502 with the data associated with the zone 100. The name "100_GRAPHIC" represents the file reference for the graphic of the zone 100, and the name "BLDG_OBJECT" represents an object name for an object that describes the overall building, not shown, but which includes the building zone 100. The child nodes of the building zone object 301 include the room space objects 302, 304, and the hall space object 306, as illustrated in FIG. 3. However, it will be appreciated that in the embodiment described herein, the child objects of the building zone object 301 also includes the mechanical space structures, such as shafts 324, 360, 362 and 364. Such connections are not shown in FIG. 3 for purposes of clarity of exposition. The controllers 406, 408, 410, 412, 414 and 416 may also suitably be child objects of the building space object 301.

FIG. 6 shows a room space object template 602. When the user creates an object for each of the first room space 102 and the second room space 104, the user employs the room space object template 602. The room space object template 602 in the exemplary embodiment described herein has an identifier value 604, a type identifier 606, and eight or more other fields, including a child field 612, a parent field 614, a graphic field 616, a sensor value field 620, a square foot field 622, a volume field 624, a location field 626, and a programming instruction field 628.

The data structure for the child field 612 is an array, with each element of the array being an identifier value for child entities of the room space, including architectural, sensor and actuator elements that are located in or affected by the room space. Architectural structures can include cubicles, work spaces or other subdivisions of a room. Because the types of possible child objects for each room space object is predetermined, the child field 612 may have a structure in which the known types of child objects (architectural, sensor and actuator) are arranged in a predetermined configuration in the data structure. Thus, devices that access child object information from the data structure can identify the type or class of each child object based upon its location within the child field array 612.

The data structure of the parent field 614 may also be an array. As with the child field 612, a room space has known types or classes of parents. In the embodiment described herein, such parent objects can include architectural, supply air and exhaust air objects. Accordingly, the parent field 614 defines an array with specific locations for architectural, supply and exhaust parent objects.

The graphic field 616 contains a pointer to a graphics file that contains a graphical representation of the room space. The data structure for the sensor value field 620 is an array containing the identification of each sensor value generated within the room. The sensor value field 620 should typically, but need not, contain values that correspond to sensor objects in the child field 612. In particular, any device that provides a temperature reading of a room space typically is located within that room space and is therefore a child object of that room space in the embodiment described herein. Regardless, in most advanced HVAC systems, each sensor value is a data point that may accessed by an identifier. Each sensor value is associated (within the model 188 and the HVAC system 200) with the sensor device that created it. For example, the temperature measured by the temperature sensor 126 may be identified as data point 126*t*. As discussed above, the sensor value field 620 contains an array of such sensor value data point identifiers.

The square foot and volume field 622 may contain integer or floating point values that provide information on the dimensions of the room space. The location field 626 is a data structure that contains coordinates and possibly shape information of the room space. The data structure of the location field 626 may suitable be an array of coordinates of four corners of the room space, or may be the coordinates of the center point of the room space.

The programming instruction field 628 contains object-specific software programs that may be accessed by the control station 202 of the system. While the control system 202 has many of its own operations, each object has the capability of having one or more specific software programs associated therewith. The object-specific programs can include programs that calibrate equipment, create temperature or occupancy logs, trend sensor data, and the like. Those of ordinary skill in the art may readily devise appropriate software programs as desired for various elements of the system.

Other fields, not shown, may otherwise identify the building automation equipment that is present in the room space.

FIG. 6*a* shows the room space object 302 formed by instantiating the room space template 602 with the data associated with the first room space 102. In FIG. 6*a*, the identification field 604 contains the object identifier "302". The type field 606 identifies that the object is a room space object. The child field 612 has an array of values identifying an architectural child object 302*a*, which corresponds to the window structure 102*a*, a sensor child object 326, which corresponds to the temperature sensor 126, and no actuator child objects. The parent object field 614 of the room space object 302 identifies an architectural parent object 301, which corresponds to the building zone 100 in which the room space 302 is located, a supply air inlet parent object 320, which corresponds to air inlet 122, and an exhaust air outlet parent object 360, which corresponds to the exhaust outlet shaft 160. It is noted that the child objects and parent objects in the fields 612 and 614 of the room space object 302 correspond to relationships illustrated in FIG. 3 for the room space object 302.

The graphic field 616 contains the file name or pointer name for a graphic file, exemplified herein as a file entitled "102_Graphic". The graphic file in the field 616 preferably includes information sufficient to provide a visual displayable rendering of the room space 102 similar to that of room space 102 in FIG. 1. Such graphic information may suitably be limited to that of the room space 102 alone, such that combination graphic depictions such as that of FIG. 1 may be accomplished by combining the individual graphic files of various objects. In another example, the graphic file 102_Graphic may be defined such that all child objects associated with the room space object 302 are automatically incorporated into the displayable image data. Other display methods and methods of combining graphics of various objects may be implemented.

Referring again to the room space object 302, the sensor value field 620 identifies the sensor value generated by the sensor 126. That value is represented herein as "126*t*". The square feet and volume field 622 contains exemplary values 110 (in square feet) and 1014 (in cubic feet), identifying that the room space 102 has an area of 110 square feet and a volume of 1014 cubic feet.

The location field 626 includes an exemplary set of Cartesian coordinate values, 472, 318. Such values are preferably referenced to a grid on which the floor plan of the building may be plotted. In this example, the location field 626 identifies coordinates of the center point of the room space 102.

The programming instruction field 628 in this example is empty, representing that the room space object 302 has no specific software instructions.

The above example provides a sample of how the room space object template 602 may be populated for the room space object 302 corresponding to room space 102 of FIG. 1.

In FIG. 6*b* shows the room space object 304 formed by instantiating the room space template 602 with the data associated with the second room space 104. The room space object 304 of FIG. 6*b* is somewhat similar to that of the room space object 302, with exceptions. For example, unlike the room space object 302, the child object field 612 of the room space object 304 only includes the sensor child object 328, and no architectural child objects.

In other portions of the object definition, the parent object field 614 of the room space object 304 identifies an architectural parent object 301 (as with the room space object 302) and a supply air inlet parent object 322, which corresponds to air inlet 122. The graphic field 616 identifies a corresponding graphic file, and the size and location fields 622 and 626, respectively, are populated with values specific to the room space 304. Similar to the room space object 302, the room space object 304 does not contain any programming instructions in the corresponding field 628.

FIG. 7 shows an inlet object template 702. When the user creates an object for each of the room inlets 120 and 122, the user employs the inlet object template 702. The inlet object template 702 in the exemplary embodiment described herein has an identifier value 704, a type identifier 706, and eight or more other fields, including a child field 712, a parent field 714, a graphic field 716, a sensor value field 718, a cross-sectional area field 720, a length field 722, a location field 726, and a programming instruction field 728.

The data structure for the child field 712 is an array, with each element of the array being an identifier value for child entities of the inlet object, including architectural, sensor and actuator elements that are located in or affected by the inlet object. As discussed above, it will be appreciated that an inlet "device" may suitably be a VAV box as is known in the art.

Architectural child objects for an inlet object can include room spaces, hall spaces or other areas in which the inlet objects provides air flow communication. As with the child field 612 of FIG. 6, the child field 712 may have a structure in which the known types of child objects (architectural, sensor and actuator) are arranged in a predetermined configuration in the data structure.

The data structure of the parent field 714 may also be an array. As with the child field 712, an air inlet has known types of parents. In the embodiment described herein, such parent objects include only architectural objects, which will typically be the shaft that supplies air to the air inlet structure.

The graphic field 716 contains a pointer to one or more graphics files that contain one or more graphical representations of the inlet structure. The data structure for the sensor value field 718 is an array containing the identification of each sensor value generated within the inlet structure. As with room space objects, the sensor value field 718 of inlet objects should typically, but need not, contain values that correspond to sensor objects identified in the child field 712.

The cross section and length fields 720 and 722 may be integer or floating point values that provide information regarding the dimensions of the inlet structure. The location field 726 is a data structure that contains coordinates of the inlet structure. The coordinates of the inlet are preferably in the same scale/coordinate system as that of the room space objects.

The programming instruction field 728 contains inlet object-specific software programs that may be accessed by the control station 202 of the system. As discussed above, the object-specific programs can include programs that calibrate equipment, create temperature or occupancy logs, trend sensor data, and the like. Those of ordinary skill in the art may readily devise appropriate software programs as desired for various elements of the system.

FIG. 7a shows the inlet segment object 320 formed by instantiating the inlet segment template 702 with the data associated with the first inlet segment 120. FIG. 7b shows the inlet segment object 322 formed by instantiating the inlet segment template 702 with the data associated with the second inlet segment 122.

Referring in detail to FIG. 7a, the identification field 704 of the inlet segment object 320 contains the object identifier "320". The type field 706 identifies that the object is an air inlet object. The child field 712 has an array of values identifying an architectural child object 302, which corresponds to the room space object 102, no sensor child objects, and two actuator child objects 314 and 336, which correspond to the ventilation damper 114 and heating coil 136, respectively. The parent object field 714 of the air inlet object 320 identifies an architectural parent object 324, which corresponds to the shaft 124. These parent/child relationships are illustrated in FIG. 3.

The graphic field 716 in the example described herein contains no file name or pointer name for a graphic file, as there may not be graphics for some devices such as air inlets. The sensor value field 718 in this example contains nothing, as there are no sensors in the air inlet. The cross sectional area field 720 contains a number 44 representative of an exemplary size, in square inches, of the air inlet. The length field 722 contains an exemplary length value of 12, representing 12 inches. The location field 726 includes an exemplary set of Cartesian coordinate values, 480, 321. As discussed above, such values are preferably referenced to the same grid as the location field values of the room space objects 302 and 304. With such information, the relative proximity of objects or devices and room spaces may be determined, and maps may be generated.

The programming instruction field 728 in this example is empty, representing that the air inlet object 320 has no specific software instructions.

The above example provides a sample of how the air inlet object template 702 may be populated for the air inlet object 320 corresponding to air inlet 120 of FIG. 1. FIG. 7b shows how the template 702 is instantiated with data for the other air inlet object 322, corresponding to the air inlet 122 of FIG. 1.

FIG. 8 shows a temperature sensor object template 802. When the user creates an object for each of the first temperature sensor object 126 and the second temperature sensor object 128, the user employs the temperature sensor object template 802. The temperature sensor object template 802 in the exemplary embodiment described herein has an identifier value 804, a type identifier 806, and seven or more fields: a parent field field 812, a vendor field 814, a characteristics field 816, a vendor model field 818, a measured temperature point identifier field 820, a programming instruction field 822, a historical maintenance data field 824 and possibly others.

The data structure of the parent field 812 may suitably be an array. The parent field 812 of a sensor object has known types of parents. In the embodiment described herein, such parent objects include only architectural objects, namely, the space in which the temperature sensor is located, and control objects (i.e. equipment controllers), including the devices that obtain sensor values from the sensor device.

The vendor field 814 may suitably be a string value (or a look-up table code) that identifies the vendor for the sensor. The characteristics field 816 contains a pointer a string, array, graphic or other file that provides characteristics of operation of the sensor, such as graphic performance information or the like. The characteristics field 816 generally identifies largely static information, such as data sheets from the manufacturer or vendor of the sensor. The vendor model field 818 is a string value providing the commercial model number for the device.

The measured temperature point identifier field 820 contains of the identification of the system data point of the temperature measured by the sensor. As discussed further above, each measured value (and also control value) has a data point identifier in a typical HVAC network. The temperature sensor object template 802 thus contains at least one field that identifies the data point in which the temperature data obtained by the temperature sensor is stored and transported.

The programming instruction field 822 contains inlet object-specific software programs that may be accessed by the control station 202 of the system. As discussed above, the object-specific programs can include programs that calibrate equipment, create temperature or occupancy logs, trend sensor data, and the like. Those of ordinary skill in the art may readily devise appropriate software programs as desired for various elements of the system.

The maintenance history field 824 is a pointer to a dynamic file that stores maintenance information regarding the sensor device. Such information may include repair logs, preventative maintenance logs, and the like.

FIG. 8a shows the temperature sensor object 326 formed by instantiating the temperature sensor template 802 with the data associated with the first temperature sensor 126. FIG. 8b shows the temperature sensor object 328 formed by instantiating the temperature sensor template 802 with the data associated with the second temperature sensor 128.

Referring in detail to FIG. 8a, the identification field 804 of the sensor object 326 contains the object identifier "326". The type field 806 identifies that the object is a sensor object. Either the type field 806 or an additional field may be used to identify that the sensor object 326 relates to a temperature sensor, as opposed to a flow sensor or other type of sensor.

The parent object field 812 of the sensor object 326 identifies an architectural parent object 302, which corresponds to the room space 102, and the controller object 406, which corresponds to the equipment controller 206 of FIG. 2. These relationships correspond to the relationships of the sensor 126 and sensor object 326 of FIGS. 2 and 3, resepectively.

The vendor field 814 contains the name of a the vendor or manufacture that supplied the sensor device, named "SENSCO" in the example herein. The characteristic field 816 in the example described herein contains a file name or pointer name for a graphic file, named herein by example as AB3_GRAPH. AB3_GRAPH may suitably be a graph of performance specifications proved by the manufacturer.

The model field 818 in this example identifies the model of the sensor device as a "AB3" model device. The point identification field 820 identifies that the value generated by the sensor device corresponds to the point "126t" of the control system.

The programming instruction field 828 in this example identifies two software routines. One routine is a diagnostic program that, when executed, causes a diagnostic routine to be performed that is specific to the sensor 126. The other routine is a routine that allows storing and retrieving maintenance history records from the maintenance history field 824. The maintenance history field 824 preferably stores a file, 326_HIST, that contains the maintenance history of the sensor, including date of installation, date of calibration, etc.

The above example provides a sample of how the sensor object template 802 may be populated for the sensor object 326 corresponding to the temperature sensor 126 of FIG. 1. FIG. 8b shows how the template 802 is instantiated with data for the other sensor object 328, corresponding to the temperature sensor 128 of FIG. 1.

FIG. 9 shows a damper object template 902. When the user creates an object for each of the dampers 112, 114 and 116, the user employs the damper object template 902. The damper object template 902 in the exemplary embodiment described herein has an identifier value 904, a type identifier 906, and eight or more fields: a parent object field 912, a vendor field 914, a characteristics field 916, a vendor model field 918, and a damper actuator control value point identifier field 920, a programming instruction field 922, a maintenance history field 924, and a calibration data field 926.

The data structure for the parent object field 912 is similar to that of the parent object field 812 of the template 802 of FIG. 8. Similarly, the vendor field 914, the characteristics field 916, the vendor model field 918, the programming instruction field 922 and the maintenance history field 924 are all similar to their counterparts of the sensor object template 802 of FIG. 8. However, the damper actuator control value point identifier field 920 contains an identifier to a control variable or "point" that is used to control the damper position. In particular, as is known in the art, a damper position is physically moved by an actuator. The actuator causes the movement responsive to received control values. The point identifier field 920 identifies the variable which is used to provide control values to the actuator for the damper described in the object.

In addition, the damper object template 902 further includes the calibration data field 926, which contains information correlating the control signals for the damper actuator with the actual position of the damper (and/or flow through the damper).

FIG. 9a shows the damper object 312 formed by instantiating the damper template 902 with the data associated with the shaft damper 112. FIG. 9b shows the damper object 314 formed by instantiating the damper template 902 with the data associated with the first room damper 114.

It will be appreciated that suitable templates may readily be created by those of ordinary skill in the art for other elements, such as, for example, flow sensors and shaft branches, water valve actuators, controllers, and other devices of the building system 100, as extensions of the examples described above. Using the above examples as a guide, those of ordinary skill in the art may readily develop appropriate templates for other building automation systems, such as security systems, fire safety systems, and the like.

The building model 188 thus provides a relatively comprehensive description of each of the building automation system devices, and relates those devices to the physical structure of the building. To this end, the building automation system device objects include, in addition to references to relevant control values of the device, but also information as to what part of the building space in which the device is located. Moreover, the building space objects are arranged hierarchically, to further interrelate system devices and values with different "zoom" levels of the building structure. It will be appreciated that the actual data objects may take many forms and still incorporate these features of the invention.

The model 188 and different models incorporating the same general principles have limitless potential for enhancing building automation system services. Software applications may use the model 188 to relate building information innumerable ways to provide better understanding and operation of building systems.

It will be appreciated that suitable templates may readily be created by those of ordinary skill in the art for other elements, such as, for example, flow sensors and shaft branches, water valve actuators, controllers, and other devices of the building system 100, as extensions of the examples described above. Using the above examples as a guide, those of ordinary skill in the art may readily develop appropriate templates for other building automation systems, such as security systems, fire safety systems, and the like.

Moreover, it is noted that the types of information accessible by each object will vary from system to system. However, in an embodiment described herein, one of the potential uses is for building maintenance and staff to obtain single point access to a wide variety of building control system data that was previously only available from a wide variety of locations (and in a wide variety of formats) throughout a facility.

To this end, it will be appreciated that the various building objects may suitably carry the following information identified in Table II. It will be noted that much of the information in Table II is already included in the exemplary objects described above, while some is not specifically illustrated or discussed above.

TABLE II (List of Object Data Fields to Facilitate Building Management)

Type of Equipment
Manufacturer
Model Number
Serial Number
Unit Capacity (e.g. chiller tonnage, air handler fan CFN rating, etc.)
Energy Usage
Specification Sheet in PDF or other electronic format
CAD drawings for entire unit
Link to manufacturer's website
Phone number to call for service
Point Name
Date Equipment is placed into Service
Date of Last Preventative Maintenance Tests
Results of Last Preventive Maintenance Tests
Temperature Drop Across a New Cooling Coil When Valve is Fully Open, etc.

The building model 188 thus provides a relatively comprehensive description of each of the building automation system devices, and relates those devices to the physical structure of the building. To this end, the building automation system device objects include, in addition to references to relevant control values of the device, but also information as to what part of the building space in which the device is located. Moreover, the building space objects are arranged hierarchically, to further interrelate system devices and values with different "zoom" levels of the building structure. It will be appreciated that the actual data objects may take many forms and still incorporate these features of the invention.

The model 188 and different models incorporating the same general principles have limitless potential for enhancing building automation system services. Software applications may use the model 188 to relate building information innumerable ways to provide better understanding and operation of building systems. By way of example, a software application may be developed to find the highest temperature in each "zone" of a building. Under prior art systems, intimate knowledge of various aspects of the system were require to put together such a program. Using the model, however, this application is readily accomplished using the general operations listed below:

1) check all child objects of each zone (i.e. room objects, hall objects, etc.) to identify all temperature sensor values associated with the child objects of each zone. The identified temperature sensor values for each zone constitute list of temperature data point identifiers for each zone;

2) obtain the current measured temperatures for each zone, or in other words, obtain the values of the identified temperature point identifiers for each zone; and 3) identify the highest value for each zone.

The model 188 makes it simple to identify which temperature data points are associated with each room space, zone space or building space. The above example is non-limiting is merely illustrates one of the advantages of the model.

One advantage of modeling includes the ability to provide highly controllable and adaptable displays of information regarding a building system. For example, the building model may be used to generate custom-requested portions of building systems by using the parent/child information, as well as the distinct object type information associated with each object of the building.

Figure 10:
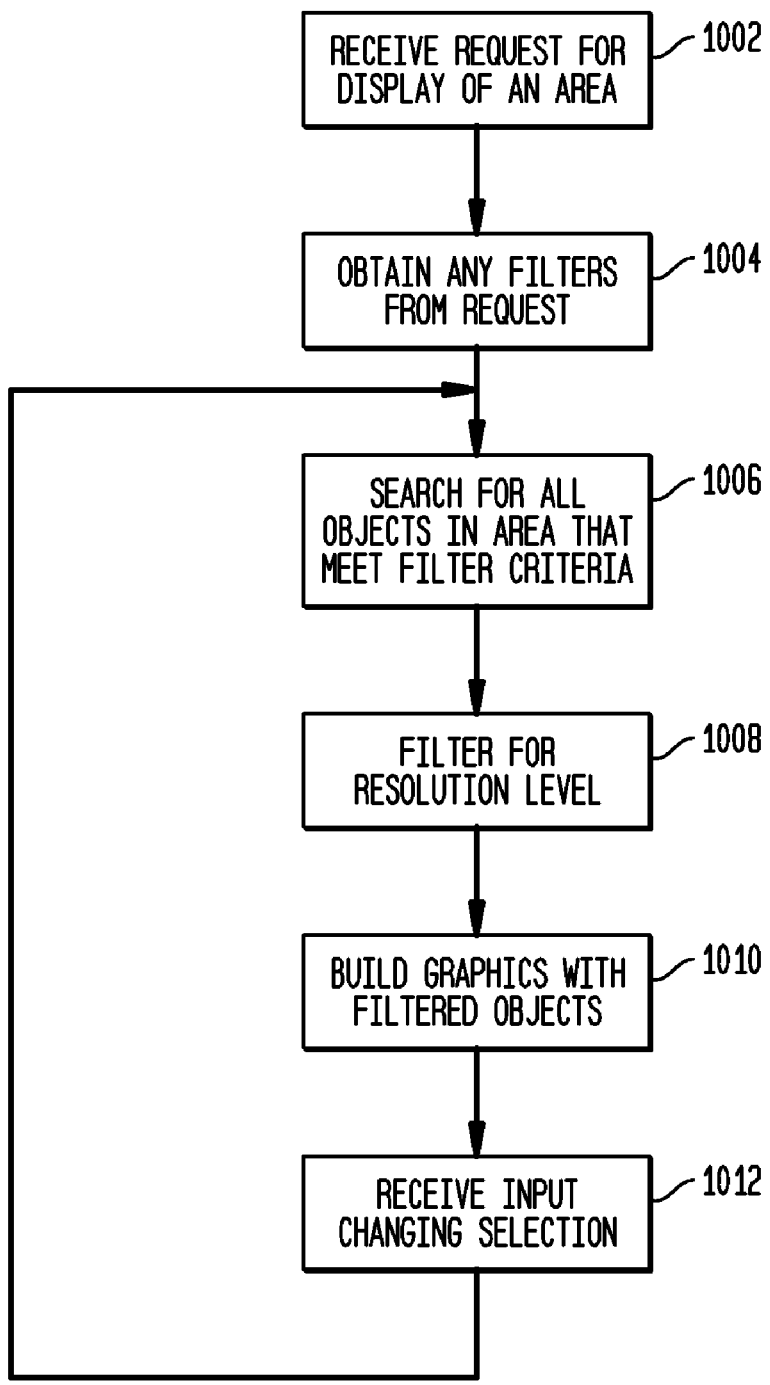
FIG. 10 is a flow diagram of an exemplary set of operations for generating a first display of building objects according to an embodiment of the invention.
Figure 11:
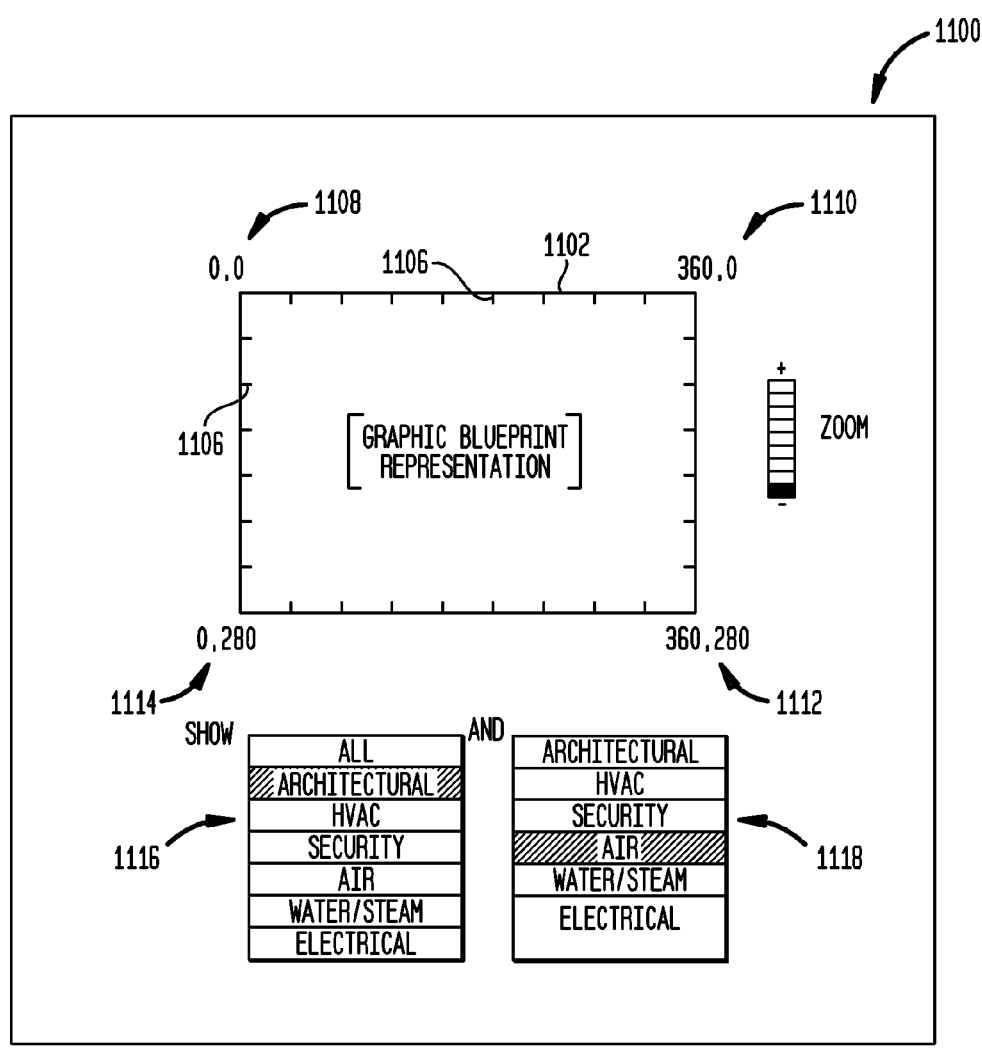
FIG. 11 is an exemplary screen display corresponding to the operation of FIG. 10.

FIG. 10 shows a process that may be executed on a computer, such as that used for the system 180 of FIG. 2, to generate displays of blueprint-style information of selected portions of a building system. FIG. 11 shows an example of a screen display 1100 that includes elements for requesting and displaying portions of the building system according to the process of FIG. 10. For the purposes of the discussion herein, it will be assumed that the system 180 performs the operations of FIG. 10 and displays the information of FIG. 11. However, it will be appreciated that the operations discussed in connection with FIGS. 10 and 11 may be performed on any general purpose computer, as well as other computing devices.

In general, the process of FIG. 10 requires that graphic data for the entire building architecture and various building systems be stored in memory 186. Such graphic data may readily be obtained from blueprint data and the like. The blueprint data includes the architectural detail of the building, including walls, floors, mechanical space and the like. The blueprint data is preferably in the form of a CAD type file. In general, CAD-type data of other building system devices can be overlain on the architectural detail, such that pipes, ventilation shafts, chiller and boiler equipment, fire safety equipment.

In accordance with the present invention, various pieces of the architectural blueprint data and building system device data are associated with corresponding building model objects such as those discussed above in connection with FIGS. 3 through 9b. The association may be done by "grouping" CAD objects of the blue-print graphics file that correspond to each building model object.

By way of example, the building space 102, which corresponds to building model object 302 of FIG. 3, would be associated with a group of blueprint CAD objects that together formulate the four walls of the room, as well as the door if necessary in the blueprint file. This association of CAD-type objects is linked to the building model objects using the graphics field 616 of the building model object file 302 (see FIG. 6a). In another example, the building model object 324 for the ventilation shaft branch 124 is associated with the group of CAD-type objects that formulate the shaft in the blueprint file. This association of CAD-type objects is similarly linked to the building model using the graphics field, not shown, of the building model object 324.

Some building model objects may not be represented graphically in the building blueprint graphic file. In addition, there are other methods to associate building model objects to graphics files that can be combined to form displays of multiple interconnected objects.

Once the graphical files are available and linked to the building model 188, then the processing circuit 184 makes provides an interactive program that allows the user to select portions of the building system to display. To this end, the processing circuit 184 provides visible output to, and receives input from, the I/O devices 182.

In any event, FIG. 11 shows an exemplary screen display of a facility viewing operation according to the process of FIG. 10. FIG. 11 shows a display 1100 that includes a graphic representation 1102 of a portion of the building architecture and/or building systems in blueprint-style form. More specifically, the graphic representation 1102 is a user-defined portion of the available building graphical data discussed above.

In addition to the display of building graphical data, the display 1100 provides fields or objects that allow the user to redefine the portion of the building system that is displayed in the graphic representation 1102. To this end, the display 1100 includes a zoom bar ZOOM, image coordinates 1108, 1110, 1112 and 1114, and pull-down filter menus 1116 and 1118.

The magnification or zoom bar ZOOM allows the user to select a zoom (i.e. magnification or resolution) level. Thus, the user may select a display window showing the entire facility, a portion of a floor that includes several rooms, a few rooms, or a single room. When zooming in (showing a portion of the existing displayed area in further detail), the user may use a curser within the graphic representation 1102 to identify what area will be displayed after the zoom. Software capable of carrying out such operations would be known to those of ordinary skill in the art.

The image coordinates 1108, 1110, 1112 and 1114 identify the boundary x-y coordinates of the portion of building system being shown in the graphic representation 1102. Thus, in the exemplary display 1100 of FIG. 11, the display 1100 shows elements of the building system that are located within the coordinates {x=0-360, y=0-280}. As illustrated in FIGS. 6a, 6b, 7a, 7b, 8a, 8b, 9a and 9b, each building model object has a location field that identifies its location on the x-y coordinate plane. As a consequence, all objects having coordinates between 0,0 and 360,280 may be displayed in the graphic representation 1102 illustrated in FIG. 11. As discussed above, however, the user may alter the zoom level using the bar ZOOM, which would result in at least some different boundary image coordinates 1108, 1110, 1112 and 1114.

In addition, the user may also change the coordinates by typing a new set of coordinates into one of the image coordinates 1108, 1110, 1112 or 1114. The other corner coordinates would change automatically in a corresponding manner.

The pull down menus 1116 and 1118 allow the user to select what types of building objects will be graphically displayed in the graphic representation. For example, the user may only desire to see the architectural blue print and the ventilation system, and not security or electrical information. In other words, the user wants to see only the walls of an particular area, along with the ventilation shafts and dampers. In such a case, the user would select filters in the menus 1116 and 1118 for architectural features and air ventilation features. The filters menus 1116 preferably allow various filters to be applied, such as "all" objects, HVAC objects (ventilation equipment, chillers, boilers, and pipes and shafts, as well as controller devices such as field panels), subsets of HVAC objects (only water/steam devices, only ventilation devices), electrical system objects, security system objects, and the like.

As the user makes selections of building system filters and zoom or magnification level, the processing circuit 184 processes the selections or request and generates the image for the graphic representation 1102 based on the request. FIG. 10 shows the operations of the processing circuit 184 to generate the image of the graphic representation 1102 from the request.

In step 1002, the processing circuit receives the request for a display of building information for an area. In the embodiment described herein, the request includes information identifying an area (e.g. x-y coordinates), and "type" information from the filter menus 1116 and 1118 identifying the types of building information to be displayed. As discussed above in connection with FIG. 11, the area information may be in the form of a zoom in or zoom out request, or the entry of x-y coordinates. Other types of area identifying information may be used.

In step 1004, the processing circuit obtains the "type" filters in the request. As discussed above, the filters identify the types of information the user would like to be displayed. As discussed above in connection with FIG. 11, common types of building information to be displayed may include architectural information, HVAC information or subsets thereof, electrical system information, security system information, and fire safety information.

In step 1006, the processing circuit 1006 searches the building model (i.e. building model 188) for all objects that meet the filter criteria and have coordinate data that falls within the area being requested. Because the objects of the model 188 include coordinate/location information, as well as object type information, the search is carried out using the building model object information.

In addition, the processing circuit 188 is configured to associate various building object types with different filters. For example, a filter selection of "architectural" is associated in the processing circuit as corresponding to building objects of the type "room space", "hall space", etc. As illustrated above in connection with FIGS. 6-9, all building objects include a field that provides such object type information.

In any event, once the building objects that fit the area and type criteria of the request are identified, the processing circuit executes step 1008. In step 1008, the processing circuit further filters the identified objects for the resolution or zoom level of the requested area. Such filtering is required because all building objects cannot always be displayed at all zoom levels. For example, a building-wide view cannot include images of all ventilation shaft dampers or hot water valves. By contrast, a zoom level that includes two or three rooms may include such images. Thus, the processing circuit filters the list of objects generated in step 1006 and only includes those devices appropriate for the zoom level. The exact determination of which objects suit each of zoom levels will be a matter of design choice.

This filtering operation of step 1008 may suitably be carried out by predetermining the zoom levels for which each building object type should be included in a graphical representation. Such information may be included in the building model objects themselves. However, in the embodiment of FIGS. 6-9, the zoom levels for which objects should be displayed is independent of the building object definitions.

After step 1008, the processing circuit has a list or group of building objects that may be represented in the graphical representation 1102 of FIG. 11. Thereafter, in step 1010, the processing circuit builds the graphical representation 1102. To this end, the processing circuit uses the graphical files referenced in each of the building object definitions. Methods of building a graphical representation using files as discussed herein would be known to those of ordinary skill in the art.

After step 1010, the graphical image 1102 of FIG. 11 provides the information requested by the user. In step 1012, the processing circuit awaits a new request. A new request may suitably be any input that changes any of the request parameters such as zoom level, coordinates, or filters. Once a new request is received, the processing circuit returns to step 1002 and proceeds as described above.

It will be appreciated that the generalized concepts of FIG. 10 may be carried out in a variety of ways.

Figure 12:
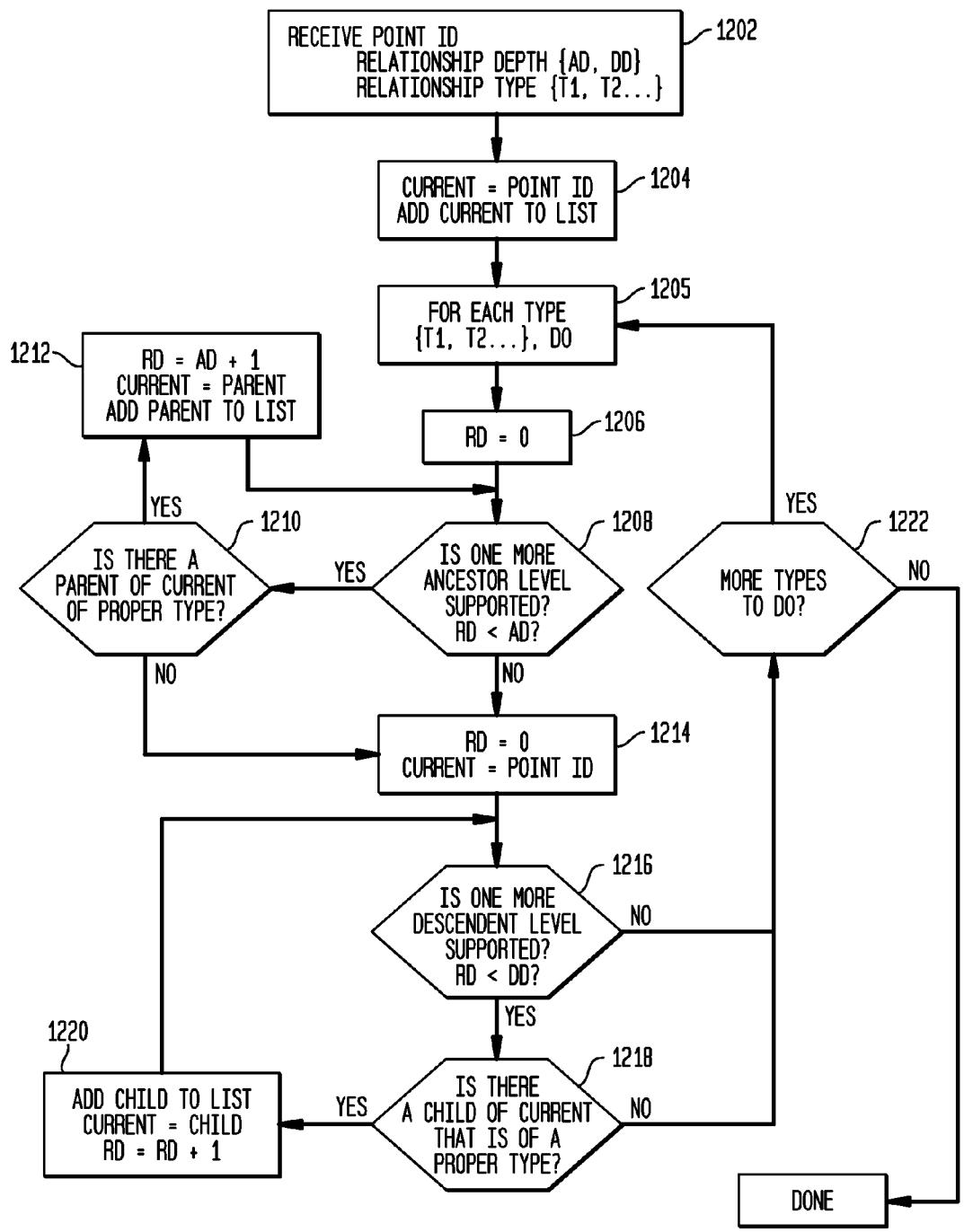
FIG. 12 is a flow diagram of an exemplary set of operations for generating a first display of building objects according to another embodiment of the invention.

FIG. 12 shows another type of facility viewing operation in which the user may select a particular point or device in the system and cause information related to the point or device to be displayed. In particular, the embodiment of FIG. 12 allows a user to specify an ID name of a device to be displayed, a number of levels of ancestor (parent, grandparent etc.) objects to be displayed, a number of levels of descendant (children, grandchildren, etc.) objects to be displayed, and the types of ancestors and/or descendants to be displayed.

For example, a user desire to see all of the HVAC elements connected to a room space. The user would specify the room space to be displayed, a desired number of ancestors, and specify that only HVAC ancestors are to be displayed. The operations of FIG. 12 cause the processing circuit to display the room and the requested levels of ancestor HVAC devices. Architectural parent objects, such as the building and floor in which the room is located, are not displayed because only HVAC ancestors were requested. Similarly, security system and electrical system devices would not be displayed. A user may employ this method to identify operational parameters of an entire portion of a building system.

In general, the processing circuit 184 determines the appropriate objects to display, based on the request, using the object definitions of the model 188.

More specifically, in step 1202, the processing circuit receives a request either directly or indirectly from a user that includes a point ID, relationship depth information including an ancestor depth AD and a descendant depth DD, and relationship "type" information listing the types of related objects T1, T2, etc. to be displayed. The point ID is the unique identifier of the building model object, such as that of the ID field 304 of the object definition 302 of FIG. 6a. The ancestor depth AD is an integer value representative of the number of ancestor generations of the selected object to display. The descendant depth DD is also an integer value representative of the number of descendant generations of the selected object to display. The relationship types T1, T2 etc. may suitably be values representative of different object type filters, similar to those shown in the menu bars 1116 and 1118 of FIG. 11. A user may select as many relationship types as desired, including all available relationship types.

In step 1204, the processing circuit sets a value CURRENT equal to the point ID of the request, and adds the value of CURRENT to a list of objects to be displayed. Thereafter, in step 1205, the processing circuit starts a do-loop or repeating loop that carries out the succeeding steps for each of the relationship types specified in the request. Thus, if the request only identifies a single object type (e.g. steam/water distribution devices), then step 1205 in only performed once. If, however, the request identifies three selected object types, then step 1205 is performed three times. After each performance of step 1205, the processing circuit performs step 1206 using one of the identified relationship types (from T1, T2 etc.) This relationship type is referred to herein as the present relationship type.

In step 1206, the processing circuit sets a counter RD=0. The counter RD represents the current relationship depth. Initially, the relationship depth of zero represents the relationship level of the requested point ID itself. In step 1208, the processing circuit determines whether another ancestor level is to be processed, or in other words, whether RD<AD. If not, then no more ancestor objects of the present relationship type (e.g. T1) are processed and the processing circuit proceeds to step 1214 to begin processing descendant objects, discussed further below. If, however, more ancestor objects are to be processed, then the processing circuit proceeds to step 1210.

In step 1210, the processing circuit determines whether there is a parent of the object identified by the value of CURRENT that is of the relationship type currently being processed. To this end, the processing circuit obtains parent information from the object definition for the point ID of CURRENT, and determines if any parent objects for CURRENT are of the present relationship type. For example, if CURRENT equals the point 302 of FIG. 6a, then processing circuit would determine whether any of the values 301, 320 or 360 from the parent object field 614 are of the relationship type (e.g. T1) currently being processed. If not, then the processing circuit proceeds to step 1214 because there are no more ancestor objects of the present relationship type (e.g. T1) to be processed. If however, the processing circuit identifies a parent of CURRENT that is of the present current type, then the processing circuit executes step 1212.

In step 1212, the processing circuit 184 adds the parent identified in step 1210 to the list of objects to be displayed. The processing circuit 184 furthermore sets the value of CURRENT equal to the parent, and increments the relationship depth value RD. The processing circuit thereafter returns to step 1208 to determine whether another ancestor level is to be processed. The processing circuit 184 then proceeds as discussed above in connection with step 1208, with RD being the newly incremented value.

As discussed above, the processing circuit 184 performs step 1214 when there are no more ancestors to process that are of the present relationship type. In step 1214, the processing circuit resets the counter RD=0, and resets CURRENT to the original point ID of the request.

Then, in step 1216, the processing circuit determines whether another descendant level is to be processed, or in other words, whether RD<DD. If not, then no more descendant objects of the present relationship type (e.g. T1) are processed and the processing circuit proceeds to step 1222. If so, however, then the processing circuit proceeds to step 1218.

In step 1218, the processing circuit determines whether there is a child of the object identified by the value of CURRENT that is of the relationship type currently being processed. To this end, the processing circuit obtains child information from the object definition for the point ID value of CURRENT, and determines if any child objects for CURRENT are of the present relationship type. For example, if CURRENT equals the point 302 of FIG. 6a, then processing circuit would determine whether any of the values 302a or 326 from the child object field 612 are of the type (e.g. T1) currently being processed. If not, then the processing circuit 184 proceeds to step 1222 because there are no more descendant objects of the present relationship type (e.g. T1) to be processed. If however, the processing circuit identifies a child of CURRENT that is of the present current type, then the processing circuit executes step 1220.

In step 1220, the processing circuit 184 adds the child object identified in step 1218 to the list of objects to be displayed. The processing circuit 184 furthermore sets the value of CURRENT equal to the child object point ID, and increments the relationship depth value DD. The processing circuit 184 thereafter returns to step 1216 to determine whether another descendant level is to be processed. The processing circuit 184 then proceeds as discussed above in connection with step 1216.

In step 1222, all appropriate ancestor and descendant objects of the current relationship type have been added to the object list to be displayed. In step 1222, the processing circuit determines whether another relationship type (e.g. T1, T2) needs to be processed. If not, then the list of objects to be displayed is complete. If so, however, then the processing circuit 184 returns to step 1205 to start processing the next relationship type in the manner discussed above.

Thus, the method displayed in FIG. 12 generates a list of objects to be displayed that corresponds to a user request. Information for the objects to be displayed may then be displayed. Such information may be textual, but preferably includes graphics.

The above-described embodiments provide user-friendly facility viewing methods that allows for various aspects of the building system to be focused on, and allows display of multiple elements related to a particular object.

In some embodiments of the facility viewer, the graphic representation of an object of the model 188 may include an active or selectable link that allows the user to access information about the object. For example, if the graphic representation 1102 of the display of FIG. 11 includes a graphic representation of the damper object 314 (see FIG. 9*b*), then the graphic representation 1102 would include a link (similar to a hyperlink, for example) that allows a user to access various information from the object definition for the damper object 314. For example, the user may be able to access diagnostic data from the field 922, historical maintenance data from field 924, and even operate some or all of the calibration program from field 922. The user could also obtain the manufacturer data sheets from field 914.

It will be appreciated that the above describe embodiments are merely exemplary, and that those of ordinary skill in the art may readily devise their own modifications and implementations that incorporate the principles of the present invention and fall within the spirit and scope thereof.

We claim:

1. A method of displaying information regarding a building, comprising:
   a) storing a model of a building system in a memory, the model comprising a plurality of building objects, each building object comprising a plurality of data fields storing information regarding the building object, the building objects including building space objects and building automation device objects, each object having a first field referencing at least one related object and a location field referencing a physical location of the object;
   b) generating display information regarding a first object, the first field of the first object identifying a plurality of related objects;
   c) receiving at least one parameter for filtering objects from the first field of the first object, the at least one parameter is one from the group consisting of: HVAC device objects, security device objects, and architectural objects;
   d) filtering the plurality of related objects of the first field of the first object based on the at least one parameter to identify at least one second object; and
   e) generating display information regarding the at least one second object filtered from the first field of the first object.

2. The method of claim 1, wherein the first field of the first object identifies at least one parent object of the first object and comprises an object representative of a building space that is associated with the first object.

3. The method of claim 2, wherein the first object further includes at least one child object.

4. The method of claim 1, wherein each of the first object and the at least one second object includes at least one second field containing information regarding a physical device represented by each respective object.

5. The method of claim 4, further comprising generating display information including a selectable link which, when actuated by a user, provides access to information contained in the second field of each of the first object and the second object.

6. The method of claim 5, wherein the information of the second field of the first object includes a reference to a file containing manufacturer-generated data regarding the associated physical device.

7. The method of claim 5, wherein the information of the second field of the first object includes calibration information regarding the associated physical device.

8. The method of claim 5, wherein the information of the second field of the first object includes a reference to an executable software program regarding the associated physical device.

9. A method of displaying information regarding a building, comprising:
   a) storing a model of a building system in a memory, the model comprising a plurality of building objects, each building object comprising a plurality of data fields storing information regarding the building object, the building objects including building space objects and building automation device objects, each object having a first field referencing at least one related object, the first field of a first object referencing a plurality of related objects;
   b) receiving a request including information identifying the first object and at least one parameter for filtering objects from the first field of the first object, the at least one parameter being one from the group consisting of: HVAC device objects, security device objects, and architectural objects;
   c) filtering the plurality of related objects of the first field of the first object based on the at least one parameter to identify a set of objects from the plurality objects; and
   d) generating display information regarding the set of objects and causing the display information to be displayed.

10. The method of claim 9, wherein the first field of the first object further identifies at least one parent object of the first object.

11. The method of claim 9, wherein the set of objects includes at least two objects.

12. The method of claim 9, wherein a second field of the first object includes a reference to a file containing manufacturer-generated data regarding the associated physical device.

13. The method of claim 9, wherein a second field of the first object includes calibration information regarding the associated physical device.

14. A method of displaying information regarding a building, comprising:
   a) storing a model of a building system in a memory, the model comprising a plurality of building objects, each building object comprising a plurality of interrelated data fields storing information regarding the building object, the building objects including building space objects and building automation device objects, each object having a first field referencing at least one related object, each object having a second field referencing a file containing manufacturer-generated data regarding an associated physical device;
   b) receiving a request including information identifying at least one object and at least one parameter for filtering objects from the first field of the at least one object;
   c) filtering the plurality of related objects of the first field of the at least one object to identify at least one second object; and
   d) generating display information regarding the at least one second object.

15. The method of claim 14, wherein the first object includes a third field that includes calibration information regarding the associated physical device.

16. The method of claim 15, wherein the first field of the first object further identifies at least one parent object of the first object.

* * * * *